(12) United States Patent
Previdi et al.

(10) Patent No.: US 10,382,334 B2
(45) Date of Patent: *Aug. 13, 2019

(54) SEGMENT ROUTING EXTENSION HEADERS

(71) Applicant: Cisco Technology, Inc., San Jose, CA (US)

(72) Inventors: Stefano B. Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,180

(22) Filed: Jul. 31, 2018

(65) Prior Publication Data

US 2018/0337856 A1    Nov. 22, 2018

Related U.S. Application Data

(63) Continuation of application No. 15/677,210, filed on Aug. 15, 2017, now Pat. No. 10,063,475, which is a
(Continued)

(51) Int. Cl.
*H04L 29/06* (2006.01)
*H04L 12/725* (2013.01)
*H04L 12/741* (2013.01)

(52) U.S. Cl.
CPC .......... *H04L 45/745* (2013.01); *H04L 45/308* (2013.01); *H04L 69/166* (2013.01); *H04L 69/22* (2013.01)

(58) Field of Classification Search
CPC ... H04L 45/745; H04L 45/308; H04L 69/166; H04L 69/22
See application file for complete search history.

(56) References Cited

U.S. PATENT DOCUMENTS

| | | | |
|---|---|---|---|
| 5,764,624 A | 6/1998 | Endo | 370/218 |
| 6,032,197 A | 2/2000 | Birdwell | 709/216 |

(Continued)

FOREIGN PATENT DOCUMENTS

| | | | | |
|---|---|---|---|---|
| CN | 1726 679 A | 1/2006 | | H04L 12/56 |
| CN | 101247 253 A | 8/2008 | | H04L 12/18 |

(Continued)

OTHER PUBLICATIONS

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

(Continued)

*Primary Examiner* — Ayaz R Sheikh
*Assistant Examiner* — Debebe A Asefa
(74) *Attorney, Agent, or Firm* — Campbell Stephenson LLP

(57) ABSTRACT

A system and method are disclosed for using segment routing (SR) in native IP networks. The method involves receiving a packet. The packet is an IP packet and includes an IP header. The method also involves updating the packet. Updating the packet involves writing information, including a segment routing segment identifier, to the destination address of the packet.

18 Claims, 17 Drawing Sheets

Related U.S. Application Data continuation of application No. 14/212,084, filed on Mar. 14, 2014, now Pat. No. 9,762,488.

(60) Provisional application No. 61/948,811, filed on Mar. 6, 2014.

(56) References Cited

U.S. PATENT DOCUMENTS

| | | | |
|---|---|---|---|
| 6,147,976 A | 11/2000 | Shand | 370/254 |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.5 |
| 7,068,654 B1 | 6/2006 | Joseph et al. | 370/392 |
| 7,072,346 B2 | 7/2006 | Hama | 370/395.5 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.5 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,848,728 B1 | 9/2014 | Revah | 370/386 |
| 8,923,292 B2 | 12/2014 | Friskney | 370/392 |
| 8,953,590 B1 | 2/2015 | Aggarwal | 370/389 |
| 9,036,474 B2 | 5/2015 | Dibirdi et al. | 370/235 |
| 9,049,233 B2 | 6/2015 | Frost et al. | |
| 9,094,337 B2 | 7/2015 | Bragg | |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 9,571,349 B2 | 2/2017 | Previdi et al. | |
| 9,660,897 B1 | 5/2017 | Gredler | |
| 9,749,227 B2 | 8/2017 | Frost et al. | |
| 2001/0037401 A1 | 11/2001 | Soumiya | 709/232 |
| 2001/0055311 A1 | 12/2001 | Trachewsky | 370/445 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0231634 A1 | 12/2003 | Henderson | 370/395.3 |
| 2004/0160958 A1 | 8/2004 | Oh | 370/395.1 |
| 2004/0174879 A1 | 9/2004 | Basso et al. | 370/392 |
| 2004/0190527 A1 | 9/2004 | Okura | 370/392 |
| 2004/0196840 A1 | 10/2004 | Amrutur et al. | 370/389 |
| 2004/0202158 A1 | 10/2004 | Takeno | 379/389 |
| 2004/0240442 A1 | 12/2004 | Grimminger | 370/389 |
| 2005/0073958 A1 | 4/2005 | Atlas | 370/238 |
| 2005/0105515 A1 | 5/2005 | Reed | 370/360 |
| 2005/0157724 A1 | 7/2005 | Montuno | 370/392 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0187817 A1 | 8/2006 | Charzinski | 370/216 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Sierecki | 370/351 |
| 2007/0058638 A1 | 3/2007 | Guichard et al. | 370/395.3 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0049610 A1 | 2/2008 | Linwong | 370/225 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.5 |
| 2008/0212465 A1 | 9/2008 | Yan | 370/225 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2008/0316916 A1 | 12/2008 | Tazzari | 370/216 |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0196289 A1 | 8/2009 | Shankar | 370/392 |
| 2009/0247157 A1 | 10/2009 | Yoon | 455/434 |
| 2009/0296710 A1 | 12/2009 | Agrawal | 370/392 |
| 2010/0063983 A1 | 3/2010 | Groarke et al. | 707/803 |
| 2010/0088717 A1* | 4/2010 | Candelore | H04N 21/234309 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.5 |
| 2010/0284309 A1 | 11/2010 | Allan et al. | 370/256 |
| 2011/0060844 A1 | 3/2011 | Allan et al. | 709/241 |
| 2011/0063986 A1 | 3/2011 | Denecheau | 370/248 |
| 2011/0090913 A1 | 4/2011 | Kim | 370/400 |
| 2011/0149973 A1 | 6/2011 | Esteve Rothenberg | 370/392 |
| 2011/0228780 A1 | 9/2011 | Ashwood-Smith | 370/392 |
| 2011/0261722 A1 | 10/2011 | Awano | 370/254 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0063526 A1 | 3/2012 | Xiao | 375/259 |
| 2012/0069740 A1 | 3/2012 | Lu et al. | 370/238 |
| 2012/0069845 A1 | 3/2012 | Carney et al. | 370/392 |
| 2012/0075988 A1 | 3/2012 | Lu | 370/218 |
| 2012/0082034 A1 | 4/2012 | Vasseur | 370/235 |
| 2012/0099861 A1 | 4/2012 | Zheng | 398/45 |
| 2012/0106560 A1 | 5/2012 | Gumaste | 370/401 |
| 2012/0120808 A1 | 5/2012 | Nandagopal et al. | 370/238 |
| 2012/0170461 A1 | 7/2012 | Long | 370/235 |
| 2012/0179796 A1 | 7/2012 | Nagaraj | 709/223 |

(56) References Cited

U.S. PATENT DOCUMENTS

| | | | |
|---|---|---|---|
| 2012/0213225 A1 | 8/2012 | Subramanian et al. | 370/392 |
| 2012/0218884 A1 | 8/2012 | Kini | 370/228 |
| 2012/0236860 A1 | 9/2012 | Kompella et al. | 370/392 |
| 2012/0243539 A1 | 9/2012 | Keesara | 370/392 |
| 2012/0287818 A1 | 11/2012 | Corti et al. | 370/254 |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077624 A1 | 3/2013 | Keesara et al. | 370/390 |
| 2013/0077625 A1 | 3/2013 | Khera | 370/390 |
| 2013/0077626 A1 | 3/2013 | Keesara et al. | 370/390 |
| 2013/0114402 A1 | 5/2013 | Ould-Brahim | 370/225 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang et al. | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0308948 A1 | 11/2013 | Swinkels | 398/66 |
| 2013/0343204 A1 | 12/2013 | Geib et al. | 370/248 |
| 2014/0160925 A1 | 6/2014 | Xu | 370/235 |
| 2014/0169370 A1 | 6/2014 | Filsfils et al. | 370/392 |
| 2014/0177638 A1 | 6/2014 | Bragg et al. | 370/395.3 |
| 2014/0189156 A1* | 7/2014 | Morris | H04L 45/745 709/238 |
| 2014/0192677 A1 | 7/2014 | Chew | 370/254 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0369356 A1 | 12/2014 | Bryant et al. | 370/392 |
| 2015/0023328 A1 | 1/2015 | Thubert et al. | 370/336 |
| 2015/0030020 A1 | 1/2015 | Kini | 370/389 |
| 2015/0109902 A1 | 4/2015 | Kumar | 370/219 |
| 2015/0249587 A1 | 9/2015 | Kozat | 370/222 |
| 2015/0256456 A1 | 9/2015 | Previdi et al. | 370/392 |
| 2015/0263940 A1 | 9/2015 | Kini | 370/236.2 |
| 2015/0326675 A1 | 11/2015 | Kini | 709/224 |
| 2015/0334006 A1 | 11/2015 | Shao | 370/225 |
| 2015/0381406 A1 | 12/2015 | Francois | 370/218 |
| 2016/0006614 A1 | 1/2016 | Zhao | 370/254 |
| 2016/0021000 A1 | 1/2016 | Previdi et al. | 370/389 |
| 2016/0034209 A1 | 2/2016 | Nanduri | 711/114 |
| 2016/0034370 A1 | 2/2016 | Nanduri | 714/6.22 |
| 2016/0119159 A1 | 4/2016 | Zhao | 370/390 |
| 2016/0127142 A1 | 5/2016 | Tian | 370/390 |
| 2016/0173366 A1 | 6/2016 | Saad | 370/218 |
| 2016/0191372 A1 | 6/2016 | Zhang | 370/390 |
| 2016/0352654 A1 | 8/2016 | Filsfils et al. | 370/392 |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2017/0019330 A1 | 1/2017 | Filfils et al. | 370/389 |
| 2017/0104673 A1 | 4/2017 | Bashandy et al. | 370/392 |
| 2017/0111277 A1 | 4/2017 | Previdi et al. | 370/392 |
| 2017/0302561 A1 | 10/2017 | Filsfils et al. | 370/389 |
| 2017/0302571 A1 | 10/2017 | Frost et al. | 370/254 |
| 2017/0346718 A1 | 11/2017 | Psenak et al. | 370/235 |
| 2017/0346737 A1 | 11/2017 | Previdi et al. | 370/392 |
| 2017/0366453 A1 | 12/2017 | Previdi et al. | 370/392 |
| 2018/0077051 A1 | 3/2018 | Nainar | 370/228 |
| 2018/0083871 A1 | 3/2018 | Filsfils | 370/392 |

FOREIGN PATENT DOCUMENTS

| | | | | |
|---|---|---|---|---|
| CN | 101399 688 A | 4/2009 | | H04L 12/18 |
| CN | 101496 357 A | 7/2009 | | H04L 12/56 |
| CN | 101616 466 A | 12/2009 | | H04W 40/02 |
| CN | 101803 293 A | 8/2010 | | H04L 12/28 |
| CN | 101841 442 A | 9/2010 | | H04L 12/56 |
| CN | 101931 548 A | 12/2010 | | H04L 12/24 |
| CN | 102098 222 A | 6/2011 | | H04L 12/56 |
| CN | 102132 533 A | 7/2011 | | H04L 12/56 |
| CN | 102299 852 A | 12/2011 | | H04L 12/56 |
| CN | 102498 694 A | 6/2012 | | H04L 12/56 |
| CN | 102714 625 A | 10/2012 | | H04L 12/56 |

OTHER PUBLICATIONS

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya, N., "Segment Routing Implications on BFD"; Sep. 9, 2013; 3 pages.

Alcatel-Lucent, "Segment Routing and Path Computation Element—Using Traffic Engineering to Optimize Path Placement and Efficiency in IP/MPLS Networks"; Technology White Paper; 2015; 28 pages.

Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.

Awduche, Daniel O., et al., "RSVP-TE: Extensions to RSVP for LSP Tunnels," Network Working Group, Internet-Draft, Aug. 2000, pp. 1-12.

Awduche, Daniel O., et al., "RSVP-TE: Extensions to RSVP for LSP Tunnels," Network Working Group, Request for Comments 3209, Dec. 2001, pp. 1-61.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Backes, P. and Rudiger Geib, "Deutsche Telekom AG's Statement About IPR Related to Draft-Geig-Spring-OAM-Usecase-01," Feb. 5, 2014, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Cisco Systems, Inc., "Introduction to Intermediate System-to-Intermediate System Protocol," published 1992-2002; pp. 1-25.

Crabbe, E., et al., Stateful PCE Extensions for MPLS-TE LSPs, draft-crabbe-pce-stateful-pce-mpls-te-00; Network Working Group, Internet- Draft, Oct. 15, 2012, pp. 1-15.

Deering, S., et al., Cisco, Internet Protocol, Version 6 (IPv6) Specification, Network Working Group, Request.

(56) References Cited

OTHER PUBLICATIONS

Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Enginering (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013; pp. 1-28.
Filsfils, C., et al., Cisco Sytems, Inc., "Segment Routing Architecture"; draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP"; draft-filsfils-spring-segment-routing-ldp-interop-01.txt; Apr. 18, 2014, pp. 1-16.
Filsfils, C. et al., "Segment Routing Architecture"; draft-ietf-spring-segment-routing-07; Network Working Group, Internet-Draft; Dec. 15, 2015; pp. 1-24.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing Use Cases", draft-filsfils-rtgwg-segment-routing-use-cases-02; Network Working Group; Internet-Draft; Oct. 21, 2013; pp. 1-36.
Filsfils, C. et al., "Segment Routing with MPLS Data Plane", draft-ietf-spring-segment-routing-mpls-05; Network Working Group; Internet-Draft; Jul. 6, 2016; 15 pages.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case,"IETF 87, Berlin, Jul./Aug. 2013, pp. 1-3.
Geib, R., Deutsch Telekom, "Use Case for a Scalable and Topology Aware MPLS data plan monitoring System," draft-geib-spring-oam-usecase-00; Internet-Draft, Oct. 17, 2013, pp. 1-7.
Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 196-201.
Kompella, K. et al, Juniper Networks, "Label Switched Paths (LSP) Hierarchy with Generalized Multi-Protocol Label Switching (GMPLS) Traffic Enginering (TE)," Network Working Group, Request 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplan;," draft-kumarkini-mpls-spring-lsp-ping-00; Network Work Group; Internet-Draft; Jan. 2, 2014, pp. 1-15.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.
Pignataro, C. et al., " Seamless Bidirectional Forwarding Detection (S-BFD)"; draft-ietf-bfd-seamless-base-11; Internet Engineering Task Force; Internet-Draft; May 6, 2016; 21 pages.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.
Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.
Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Li, T., et al., Redback Networks, Inc., "IS-IS Extensions for Traffic Engineering," Network Working Group, Request for Comments 5305, Oct. 2008, 17 pages.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

(56) References Cited

OTHER PUBLICATIONS

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Vasseur, JP, et al.; Cisco Systems, Inc. Path Computation Element (PCE) Communication Protocol (PECP): Request for Comments: 5440, Internet Engineering Task Force, IETF: Standard, Internet Society (ISOC) 4, Rue Des Falaises CH-1205, Geneva Switzerland chapters 4-8, Mar. 2009; pp. 1-87.

Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

\* cited by examiner

Node A
SA=A
DA=Z

SR EH
no

Trace EH
no

*FIG. 16A*

Node B
SA=A
DA=C

→ SR EH
SL1: D, length of SL2
SL2: E, length of SL3
SL3: Z, null
PL1: C, length of PL2
PL2: B, length of PL3
PL3: E, null

Trace EH
SL1: B, null

*FIG. 16B*

Node C
SA=A
DA=D

→ SR EH
SL1: D, length of SL2
SL2: E, length of SL3
SL3: Z, null
PL1: C, length of PL2
PL2: B, length of PL3
PL3: E, null

Trace EH
SL2: C, length of SL1
SL1: B, null

*FIG. 16C*

Node D
SA=A
DA=E

SR EH
SL1: D, length of SL2
SL2: E, length of SL3
→ SL3: Z, null
PL1: C, length of PL2
PL2: B, length of PL3
PL3: E, null

Trace EH
SL3: D, length of SL2
SL2: C, length of SL1
SL1: B, null

*FIG. 16D*

Node E
SA=A
DA=Z

SR EH
no

Trace EH
no

*FIG. 16E*

SEGMENT ROUTING EXTENSION HEADERS

RELATED APPLICATIONS

The present patent application is a continuation of U.S. patent application Ser. No. 15/677,210, filed Aug. 15, 2017, entitled "Segment Routing Extension Headers," which is a continuation of U.S. patent application Ser. No. 14/212,084, filed on Mar. 14, 2014, entitled "Segment Routing Extension Headers", now U.S. Pat. No. 9,762,488 and issued on Sep. 12, 2017; which claims the domestic benefit under Title 35 of the United States Code § 119(e) of U.S. Provisional Patent Application Ser. No. 61/948,811, filed on Mar. 6, 2014 entitled "Segment Routing Extension Headers." All are hereby incorporated by reference in their entirety and for all purposes as if completely and fully set forth herein.

BACKGROUND

Network nodes are capable of receiving and forwarding packets. Network nodes may take form in one or more routers, one or more bridges, one or more switches, one or more servers, or any other suitable communications processing device. A packet is a formatted unit of data that typically contains control information and payload data. Control information may include, for example: source and destination IP addresses, error detection codes like checksums, sequencing information, and the like. Control information is typically found in packet headers and trailers, and payload data is typically found in between the headers and trailers.

Packet forwarding involves decision processes that, while simple in concept, can be complex. Since packet forwarding decisions are handled by nodes, the total time required to perform packet forwarding decision processes can become a major limiting factor in overall network performance. Different types of networks can employ different packet forwarding mechanisms. Ensuring interoperability between the types of networks and packet forwarding mechanisms enables advantages from one type of packet forward mechanism to be leveraged in multiple network types.

BRIEF DESCRIPTION OF THE DRAWINGS

A more complete understanding of the present disclosure may be acquired by referring to the following description and accompanying drawings, in which like references numbers indicate like features.

FIGS. 16A-16E show examples of modifications made to portions of a packet's headers.

Figure 1:
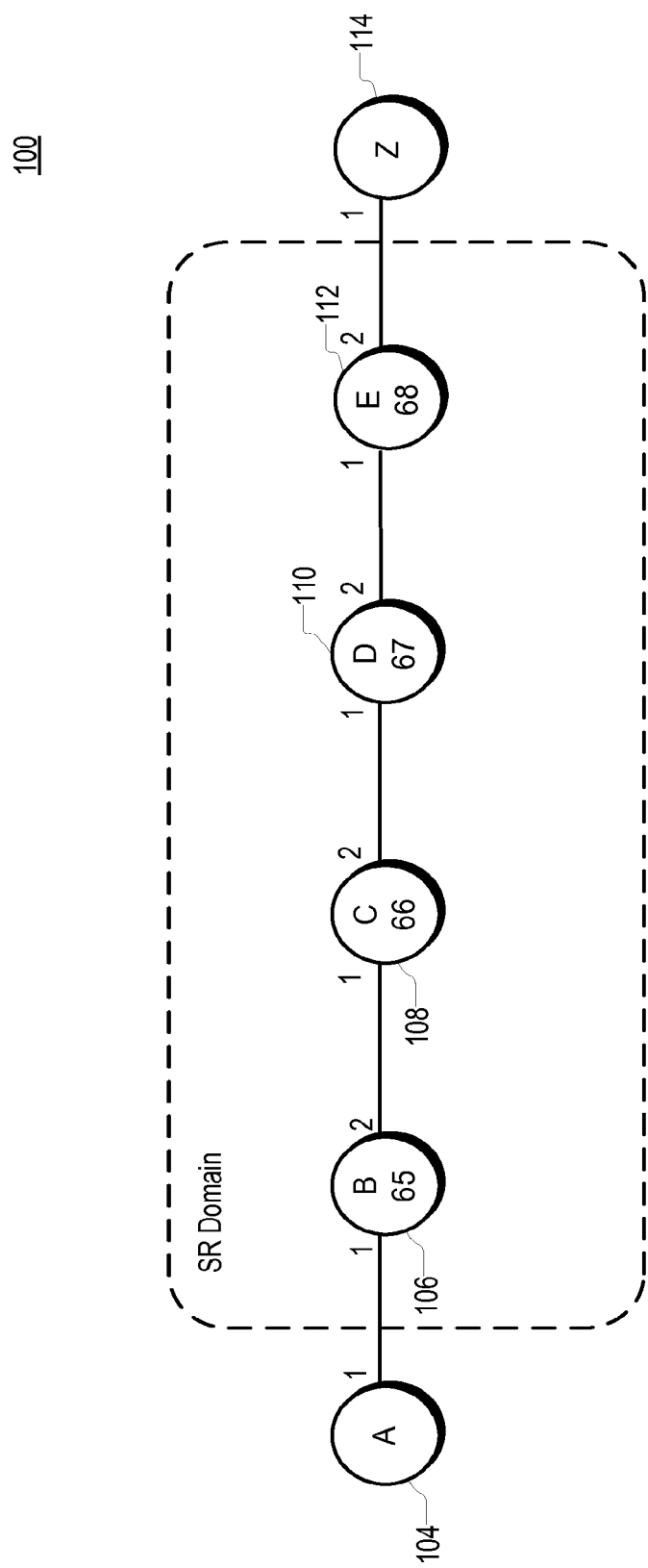
FIG. 1 is a block diagram illustrating an example network.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

A system and method are disclosed for using segment routing (SR) in native IP networks. The method involves receiving a packet. The packet is an IP packet and includes an IP header. The method also involves updating the packet. Updating the packet involves writing information, including a segment routing segment identifier, to the destination address of the packet.

Packet Forwarding Mechanisms

Internet protocol (IP) routing and multi-protocol label switching (MPLS) are distinct packet forwarding mechanisms. IP routing uses IP addresses inside packet headers to make packet forwarding decisions. In contrast, MPLS implements packet forwarding decisions based on short path identifiers called labels, which are attached to packets. Segment routing (SR) is yet another packet forwarding mechanism. SR is similar to MPLS in many regards. For example, packet forwarding decisions in SR can be based on short path identifiers called segment IDs attached to packets. However, substantial differences exist between SR and MPLS as will be more fully described below.

IP Routing

IP routing uses IP forwarding tables, which are created at nodes using routing information distributed between nodes via one or more protocols like the internal gateway protocol (IGP) and/or the border gateway protocol (BGP). In simple terms, IP forwarding tables map destination addresses to the next hops that packets take to reach their destinations. When a node receives a packet, the node can access a forwarding table using the destination address in the packet and lookup a corresponding egress interface for the next hop. The node then forwards the packet through the egress interface. The next hop that receives the packet performs its own forwarding table lookup using the same destination IP address, and so on.

MPLS and LDP

MPLS is commonly employed in provider networks. Packets enter an MPLS network via an ingress edge node, travel hop-by-hop along a label-switched path (LSP) that typically includes one or more core nodes, and exit via an egress edge node.

Packets are forwarded along an LSP based on labels and LDP forwarding tables. Labels allow for the use of very fast and simple forwarding engines in the data plane of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is employed in the control planes of nodes. Two nodes, called LDP peers, can bi-directionally exchange labels on a FEC-by-FEC basis. LDP can be used in a process of building and maintaining LDP forwarding tables that map labels and next hop egress interfaces. These forwarding tables can be used to forward packets through MPLS networks as more fully described below.

When a packet is received by an ingress edge node of an MPLS network, the ingress node may determine a corresponding FEC. Characteristics for determining the FEC for a packet can vary, but typically the determination is based on the packet's destination IP address. Quality of Service for the packet or other information may also be used to determine the FEC. Once determined, the ingress edge node can access a table to select a label that is mapped to the FEC. The table may also map a next hop egress interface to the FEC. Before the ingress edge node forwards the packet to the next hop via, the ingress node attaches the label.

When a node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the node swaps the incoming label with the outgoing label. The next hop receives the packet with label and may perform the same process. This process is often called hop-by-hop forwarding along a non-explicit path. The penultimate node in the LSP may pop or remove the incoming label before forwarding the packet to an egress edge node in the network, which in turn may forward the packet towards its destination using the packet's destination address and an IP forwarding table.

Segment Routing

Segment routing (SR) is a mechanism in which nodes forward packets using SR forwarding tables and segment IDs. Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR) make packet forwarding decisions based on segment IDs as opposed to labels, and as a result SR nodes need not employ LDP in their control planes. Unless otherwise indicated, the SR nodes described below lack LDP in the control plane.

Packets can enter an SR enabled network (i.e., a network of nodes that are SR enabled) via an ingress edge node, travel hop-by-hop along a segment path (SP) that includes one or more core nodes, and exit the network via an egress edge node. Like labels, segment IDs are short (relative to the length of an IP address or a FEC), fixed-length identifiers. Segment IDs may correspond to topological segments of a network, services provided by network nodes, etc. Topological segments represent one-hop or multi-hop paths to SR nodes. Topological segments act as sub-paths that can be combined to form an SP. Stacks of segment IDs can represent SPs, and SPs can be associated with FECs as will be more fully described below.

There are several types of segment IDs including nodal segment IDs, adjacency segment IDs, area segment IDs, service segment IDs, etc. Nodal segment IDs are typically assigned to nodes such that no two SR nodes belonging to a network domain are assigned the same nodal segment ID. Nodal segment IDs can be mapped to unique SR node identifiers such as node loopback IP addresses (hereinafter node loopbacks). In one embodiment, all assigned nodal segment IDs are selected from a predefined ID range (e.g., [32, 5000]). A nodal segment ID corresponds to a one-hop or a multi-hop, shortest path (SPT) to an SR node assigned the nodal segment ID, as will be more fully described below.

An adjacency segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency segment IDs; adjacency segment IDs may not be unique within a network. This disclosure will presume that only one link exists between nodes in a network, it being understood the present disclosure should not be limited thereto.

Each SR node can assign a distinct adjacency segment ID for each of the node's links. Adjacency segment IDs are locally significant; separate SR nodes may assign the same adjacency segment ID, but that adjacency segment ID represents distinct links. In one embodiment, adjacency segment IDs are selected from a predefined range that is outside the predefined range for nodal segment IDs.

SR nodes can advertise routing information including nodal segment IDs bound to loopbacks, adjacency segment IDs mapped to link IDs, etc., using protocols such as IGP and/or BGP with SR extension. Nodes can use the routing information they receive to create or update SR forwarding tables. To illustrate, SR nodes may use the routing information they receive and protocols such as open shortest path first (OSPF) with SR extension in order to create topology maps of the network, which in turn can be used to identify next hop egress interfaces of shortest paths (SPTs) to respective node loopbacks. The identified SPT or next hop egress interfaces are then mapped to respective nodal segment IDs in an SR forwarding table. Nodes can also map their adjacency segment IDs to egress interfaces for respective links in SR forwarding tables. Because adjacency segment IDs are locally significant, however, adjacency segment IDs should only be mapped in SR forwarding tables of the nodes that advertise the adjacency segment IDs. In other words, an SR node that advertises an adjacency segment ID should be the only node in the network area that has an SR forwarding table that maps the adjacency segment ID to an egress interface.

As noted above, SR enables segment paths (SPs), which can be used for transporting packets through a network. SPs can be associated with FECs, and can be established for a variety of purposes. Packets associated with the same FEC normally traverse the same SP towards their destination. Nodes in SPs make forwarding decisions based on segment IDs, not based on the contents (e.g., destination IP addresses) of packets. As such, packet forwarding in SPs is not dependent on a particular Layer 2 technology.

Edge nodes and/or other devices (e.g., a centralized control plane server) of an SR network use routing information (nodal segment IDs bound to loopbacks, adjacency segment IDs mapped to link IDs, etc.) they receive in link advertisements to create ordered lists of segment IDs (i.e., segment ID stacks). Segment ID stacks correspond to respective SPs. Individual segment IDs in a segment ID stack may correspond to respective segments or sub paths of a corresponding SP.

When an SR ingress edge node receives a packet, the node or a centralized control plane server in data communication with the node, can select an SP for the packet based on information contained in the packet. In one embodiment, a FEC may be calculated for the packet using the packet's destination address. The FEC is then used to select a segment ID stack mapped thereto. The ingress edge node can attach the selected segment ID stack to the packet via an SR header. The packet with the attached segment ID stack is forwarded along and can traverse the segments of the SP in an order that corresponds to the list order of the segment IDs in the segment ID stack. A forwarding engine operating in the data plane of each SR node can use the top segment ID within the segment ID stack to lookup the egress for the next hop. As the packet and attached segment ID stack are forwarded along the SP in a hop-by-hop fashion, segment IDs can be popped off the top of the segment ID stack. In another embodiment, the attached stack of segment IDs remains unchanged as the packet is forwarded along the SP. In this embodiment, a pointer, or some other information is used to identify an active segment ID in the segment ID stack. The pointer can be advanced as the packet is forwarded along the SP. In contrast to MPLS, however, segment IDs are typically not swapped as the packet and attached segment ID stack are forwarded along the SP.

Segment Routing in IPv6 Networks

As discussed above, SR has numerous advantageous properties. However, some networks do not inherently provide SR functionality. For example, a native IPv6 network uses IPv6-compatible protocols in the control plane and data plane. This means that the control protocols which nodes use to exchange forwarding information in an IP network do not explicitly support SR. Likewise, the data plane in some IPv6 networks, if not modified, does not support SR forwarding operations. And even in cases where a network does support SR, there may be portions of the network that do not use SR. For example, home networks, where packets are generated at hosts and sent to servers, generally do not use SR between the host that generates the packets and servers that digest the packets. At another end of the network, e.g., a datacenter, SR is also not used in some instances. In these network edge examples, IP is often used to forward packets, and SR is often not used.

IPv6 is a version of IP routing that improves upon previous versions. For example, IPv4 uses 32-bit addresses. IPv6, on the other hand, uses 128-bit addresses, which significantly increases the number of addresses that can be assigned to network devices. Another feature provided by IPv6 is the capability to define extension headers. Extension headers are optional headers used to carry additional information in a packet header. Extension headers are placed in the packet between the fixed IPv6 header and an upper-layer protocol header (e.g., a TCP header).

To use SR in an IP network, such as the network shown in FIG. 1, modifications are made to the IPv6 data plane that allow a packet to encode a list of segments (e.g., a segment ID stack) in an IPv6 packet header and forward the packet according to the list of segments. This is accomplished using the extension headers provided by IPv6. One type of SR extension header is an SR extension header that includes a segment list, or segment ID stack, that is used to forward a packet along the SP defined by the segment ID stack. This is known simply as an SR extension header. A second type of SR extension header is an SR trace header. An SR trace header provides operation, administration, and management (OAM) functions, such as collecting information identifying the route taken by a packet, whether the packet was rerouted, and the like.

FIG. 1 shows an example network 100. Network 100 is a native IPv6 network. The nodes in network 100 are configured to use IPv6 in the control and data plane. Network 100 includes an SR domain that includes several nodes that are configured to use SR to forward packets. These are SR nodes 106-112. The SR domain is in communication with non-SR nodes 104 and 114. Non-SR nodes 104 and 114 do not use SR to forward packets. Instead, they use another packet forwarding mechanism, such as IPv6. SR nodes 106-112 are assigned unique nodal-segment IDs 65-67, respectively. In addition to the nodes shown, network 100 can include any number of nodes in between the nodes shown. The nodes that are not shown can be SR nodes and/or IP nodes.

Each of the SR nodes 106-112 have interfaces that are identified as shown. For example, node 108 has two interfaces designated 1-2, respectively. Each of the nodes 106-112 is assigned a unique loopback. Loopbacks B-E are assigned to nodes 106-112, respectively. These loopbacks are unique in the network and can be used for several purposes, such as calculating the topology of network 100, which in turn can be used to create SPs and/or to identify SPTs and thus next hop egress interfaces, for SR forwarding tables. Nodes 106-112 can also assign locally significant adjacency-segment IDs. For example, node 108 can assign adjacency-segment IDs 9001-9002 to links CB and CD, respectively.

Each of SR nodes 106-112 can advertise routing information to the other nodes in network 100 using IGP with SR extension. For example, node 108 can generate and send one or more link state advertisements that include adjacency-segment IDs 9001-9002 bound to link IDs CB and CD, respectively, and nodal-segment ID 66 bound to loopback C. One of ordinary skill understands that link state advertisements may contain additional information. Using the advertisements they receive, the control planes of nodes 106-112 can generate respective SR forwarding tables for use in the data planes. For example, node 108 can generate example SR forwarding table that maps adjacency-segment IDs 9001-9002 to node interface IDs 1-2, respectively, and nodal-segment IDs such as 65 and 67 to node 108 interfaces 1 and 2, respectively, which are the SPT next hop egress interfaces determined by node 108 for loopbacks B and D, respectively.

Node 106 is an ingress edge node for the SR domain. Node 106 is configured to receive packets that are not SR packets, e.g., packets that do not contain SR information, and modify the packets such that the packets can be forwarded by SR nodes using SR. In one embodiment, this involves adding a SR extension header to a packet. Node 106 can also add a trace extension header to provide OAM functions for packets forwarded using SR. The SR extension headers are used by the SR nodes to forward packets using SR and record information regarding the forwarding. That is, forwarding operations are performed by the SR nodes based upon the segment identifiers (IDs) included in the segment list. Node 112 is an egress edge router for the SR domain. Node 112 can remove SR information, such as SR extension headers, from the packet before forwarding the packet to Node 114.

Figure 2:
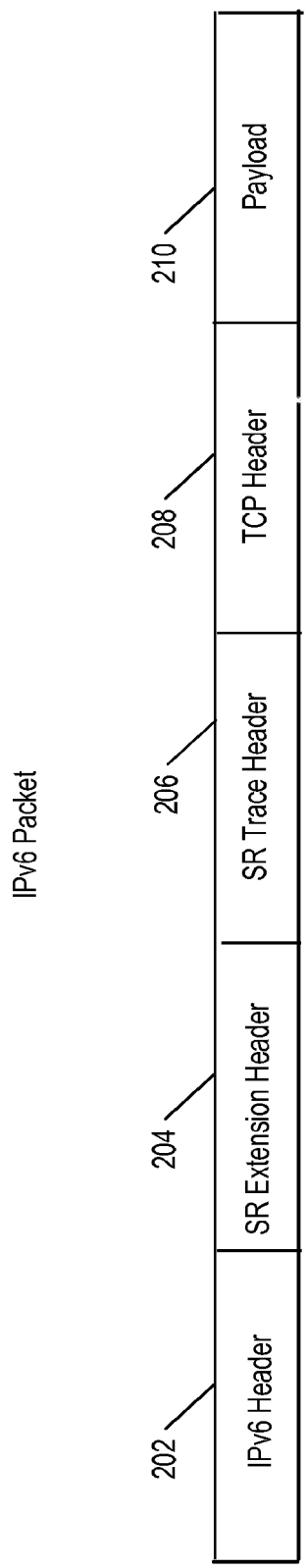
FIG. 2 is a block diagram illustrating an example IPv6 packet.

FIG. 2 is a block diagram illustrating an example IPv6 packet. As shown at 202, the packet includes an IPv6 header. The IPv6 header includes, among other fields, a source address field and a destination address field. The source address field identifies a network device from which the packet originated. In IPv6, a source address is 128 bits. The destination address identifies the node to which the packet is destined. Similar to the source address, the destination address used by IPv6 nodes is 128 bits.

IPv6 headers support multiple types and numbers of extension headers. The IPv6 header shown in FIG. 2 includes, at 204, an SR extension header. An SR extension header is a routing header (e.g., the type of extension header associated with the SR extension header is "routing") that can be used to control how packets are forwarded. In one embodiment, the SR extension header includes an SR segment list.

At 206, the IPv6 header includes a second extension header, specifically an SR trace header. The SR trace header is also a routing header that provides OAM functionality for the IPv6 packet. For example, the SR trace header accumulates information indicating what route the packet has taken and what operations were performed by the nodes which the packet traversed along the route.

After the SR extension headers, the IPv6 packet of FIG. 2 includes an upper layer protocol header, such as TCP header, as shown at 208. Following the upper layer protocol header is a payload, as shown at 210. The payload includes the data being transmitted in the packet, any footers, trailers, CRCs, checksums, and the like.

Figure 3:
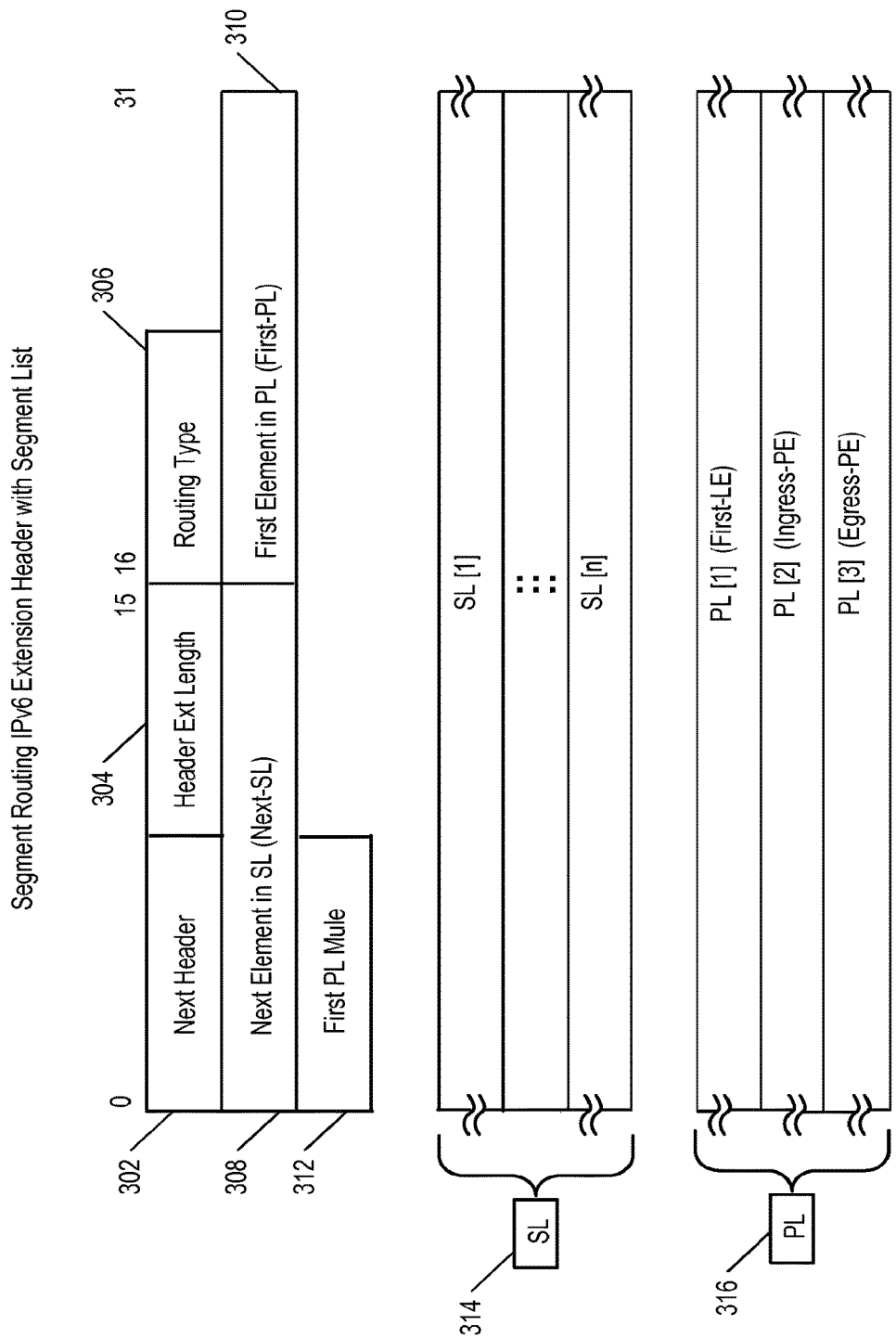
FIG. 3 is a block diagram illustrating an example SR extension header with a segment list.

FIG. 3 is a block diagram illustrating an example segment routing extension header. The segment routing extension header shown in FIG. 3 includes a segment list 314. In one embodiment, the segment routing extension header shown in FIG. 3 illustrates further details of the segment routing extension header 204 shown in FIG. 2. As shown in FIG. 3, the segment routing extension header includes a number of fields.

At 302, a next header field is shown. The next header includes an 8-bit value that identifies the type of header immediately following the segment routing extension header. For example, the value can indicate that another routing extension header is included in the packet following the segment routing extension header. The next header field can indicate one of a number of other types associated with the various types of extension headers supported by IPv6, such as hop-by-hop, fragment, and the like. In one embodiment, the next header value corresponds to an upper level protocol header, such as a TCP header, indicating the no subsequent extension headers are present in the packet.

The segment routing extension header also includes a header extension length field 304. The header extension length field includes an 8-bit unsigned integer. This value defines the length of the segment routing extension header in 8 byte units, not including the first 8 bytes. The maximum value of an 8-bit number is 256. The header extension length field 304 can therefore indicate that the length of the segment routing extension header (not including the first 8 bytes) is up to 2048 bytes long (256*8).

At 306, the segment routing extension header includes a routing type field. The segment routing extension header is a routing extension header. The routing type field identifies which type of routing the extension header is associated with. In the case of the segment routing extension header of FIG. 3, the routing type field includes a value that identifies segment routing as the routing type.

At 308, the segment routing extension header includes a field that indicates the next element in the segment list. This field functions as a pointer to identify the active segment in the segment list. As a packet is forwarded from segment to segment along its path, nodes (e.g., segment endpoints) update this field to indicate the active segment. The next element in the segment list includes 16 bits. The first 12 bits, or most significant 12 bits, provide an offset into the segment routing extension header. The location of the next segment that a packet will follow can be determined by the value encoded in the next element field. The offset is expressed in bytes. For example, if the value encoded in the next element field is 512, then an identifier for the next segment in the path that the packet should follow can be found by counting 512 bytes into the segment list 314.

Following the 12-bit offset, is a length multiplier bit. If the length multiplier bit is not set, then the three bit value in the length portion of the field refers to 4-byte multiples. If the length multiplier bit is set, then the three bits of the length field refer to 16 byte multiples. Following the multiplier bit, are three length bits. The length bits specify the length of the active segment in either 4 or 16-byte multiplies, depending on whether or not the multiplier bit is set. For example, if the three bit length value is 4, and the multiplier bit is not set, then the length of the next element is 16 bytes. In another example, if the three bit length value is 2, and the multiplier bit is set, then the length of the next element is 32 bytes.

At 310, the segment routing extension header includes a field that points to the first element in the policy list. The policy list is the list of routing information that follows the segment list in the segment routing extension header. In one embodiment, the policy list is not inspected for routing purposes. The policy list, in one embodiment, is inserted into the SR extension header at ingress to the SR domain (e.g., by an ingress node) and removed at egress from the SR domain (e.g., by an egress node). The format of the field which identifies the first element of the policy list is as follows. The first 12 bits, or the most significant 12 bits, provide an offset in the segment routing extension header that point to the location where the first element of the policy list is located. The location of the first element in the policy list can be determined by the value encoded in the first element in the policy list field. The offset is expressed in bytes. For example, if the value encoded in the first element in the policy list field is 1024, then an identifier for the first element in the policy list can be found by counting 1024 bytes into the segment routing extension header.

The next bit in the first element in the policy list field is a multiplier bit. If the length multiplier bit is not set, then the three bits of length in this field refer to 4-byte multiples. If the length multiplier bit is set, then the three bits of length refer to 16 byte multiples. The next three bits in the 16-bit first element in policy list field are length bits. The value of the three bit length field indicates the length of the first element in the policy list in either 4 byte or 16-byte multiples, depending on whether or not the multiplier bit is set. For example, if the three bit length value is 4, and the multiplier bit is not set, then the length of the first element in the policy list is 16 bytes. In another example, if the three bit length value is 2, and the multiplier bit is set, then the length of the first element in the policy list is 32 bytes.

The next field in the segment routing extension header is the first policy list mule, as shown at 312. The first policy list mule contains a copy of the mule (explained below) of the first policy list element in the policy list. Storing a copy of the first policy list element mule at this location in the segment routing extension header facilitates fast access to any flags that may have been updated as the packet traversed the segment identified by the first policy element.

The next portion of the segment routing extension header, as shown at 314, is a segment list. The segment list includes information identifying segments that the packet follows when being forwarding using segment routing, such as a list of segments. The first segment list element in segment list 314 includes information identifying the second segment in the segment path. The first segment identifier (representing the first segment in the list of segments that encodes the segment path) is not added to segment list 314 in one embodiment. Instead, a first segment identifier is extracted from the first segment element and is written to the destination address of the packet in the fixed IPv6 header. Since the first segment identifier is already included in the destination address, including the first segment identifier in the first position of the segment list would be redundant. Excluding the first segment identifier from the segment list enables effective utilization of limited resources, such as memory, by keeping important information (e.g., information that is used to forward the packet) close to the front of the segment routing extension header.

Figure 4:
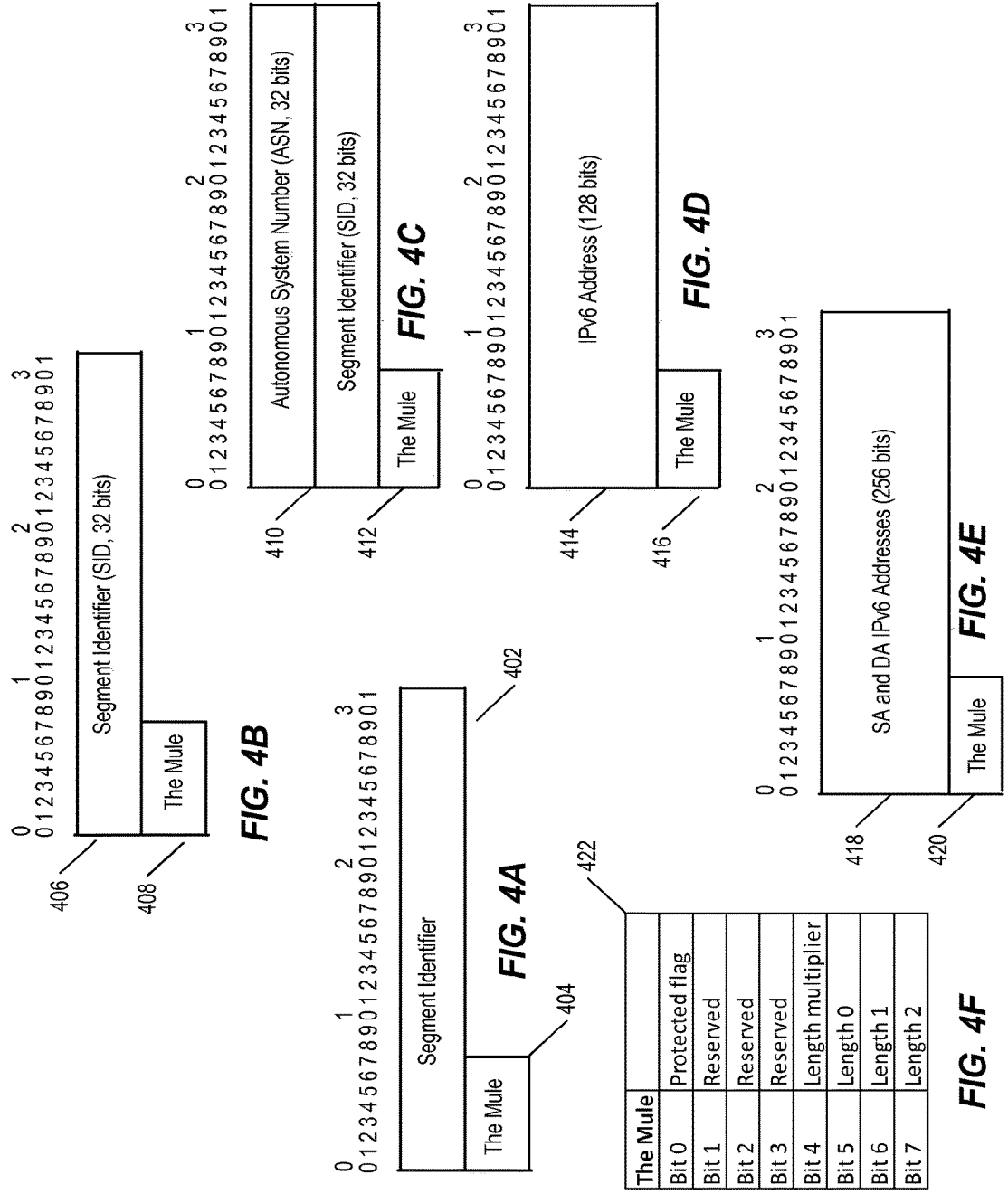
FIGS. 4A-4F show additional details regarding an example SR extension header with a segment list.

Traditional IPv6 uses fixed length addresses, e.g., of 128 bits. For example, a source address or a destination address included in an IPv6 header, such as IPv6 header 202 of FIG. 2, uses 128 bits to identify the source or destination of a packet. In some embodiments, SR uses fewer bits to identify a segment which a packet is to travel. Each of the elements in segment list 314 and policy list 316 is a variable length element of, for example, 32 bits, 64 bits, 128 bits, or 256 bits. The length of segment list elements and policy list elements can be 32 bits. When one of these elements is 32 bits, the element includes a 4 byte segment identifier (SID). If an element is 64 bits, the element includes a 32-bit autonomous system number (ASN) followed a 32-bit SID. Two bytes of the ASN number are encoded with the two leading bytes set to zero. If the element is 128 bits, the element contains a plain 128-bit IPv6 type address. For example, the IPv6 address of a particular node, such as the node at which a given segment (e.g., a nodal segment or an adjacency segment) ends is used as the SID for that segment. If the element is 256 bits, the element contains two IPv6 addresses: an IPv6 source address; and an IPv6 destination address. Each element (whether a segment list element (SLE) or a policy list element (PLE) also includes an 8-bit mule field. The mule includes flags related to the segment list entry or policy list entry the mule is associated with. Details of the mule are given with respect to FIG. 4.

Following segment list 314 is policy list 316. As noted above, the first element of policy list 316 is the first segment list element. The second policy list element of policy list 316 identifies the ingress node of the segment routing domain. The third policy list element of policy list 316 identifies the egress node of the SR domain. Storing information identifying the ingress node and the egress node facilitates operations such as gathering statistics, filtering, deep packet inspection, and the like. For example, if an operator wants to filter nodes that entered the SR domain via a given ingress node, the operator can examine the second element of the policy list of packets to determine whether the packets entered the SR domain via the given ingress node.

FIGS. 4A-4F show additional details regarding an example SR extension header with a segment list. As described with regard to FIG. 3, both the segment list and the policy list included in the segment routing extension header include elements. In one embodiment, segment list elements (SLEs) and policy list elements (PLEs) are encoded using the same format. An example of a segment list element is shown at FIG. 4A. For the purposes of FIGS. 4A-4F, the description refers to a segment list element. It is understood that corresponding description applies to policy list elements as well. The segment list element of FIG. 4A includes a segment identifier field 402 and a mule field 404.

FIG. 4B shows an example where the segment list element includes a 32-bit segment identifier at 406 and an 8-bit mule at 408. FIG. 4C shows an example where the segment list element includes a 32-bit segment identifier and a 32-bit autonomous system number, at 410. The segment list element also includes, at 412, a mule. FIG. 4D shows, at 414, a 128-bit IPv6 address. At 416, the segment list element shown in FIG. 4D includes attached 8-bit mule. FIG. 4E shows an example where, at 418, a 256-bit field is included in the segment list element. A 256-bit field includes an IPv6 source address and an IPv6 destination address, both of 128 bits. At 420, the mule attached to the 256-bit segment element is shown.

FIG. 4F shows an example of a mule. As shown at 422, the first-bit of the mule, -bit zero, includes a protected flag. The protected flag indicates whether a packet was rerouted during traversal of the segment associated with the segment ID in the segment list element with which the mule is associated. Bits 1-3 of the mule are reserved. In one embodiment, reserved bits are set to zero. Bit 4 includes a length multiplier. When not set, the three bits of length information refer to 4 byte multiples, when set the three bits of length of information refer to 16 byte multiples. Bytes 5-7 are the three length bits. The value represented by the three bits of length is multiplied by either 4 or 16 bytes depending on whether or not the length multiplier bit is set. The length value included in the mule defines the length of the next segment element. The length value is set to zero in the last element of the segment list.

Figure 5:
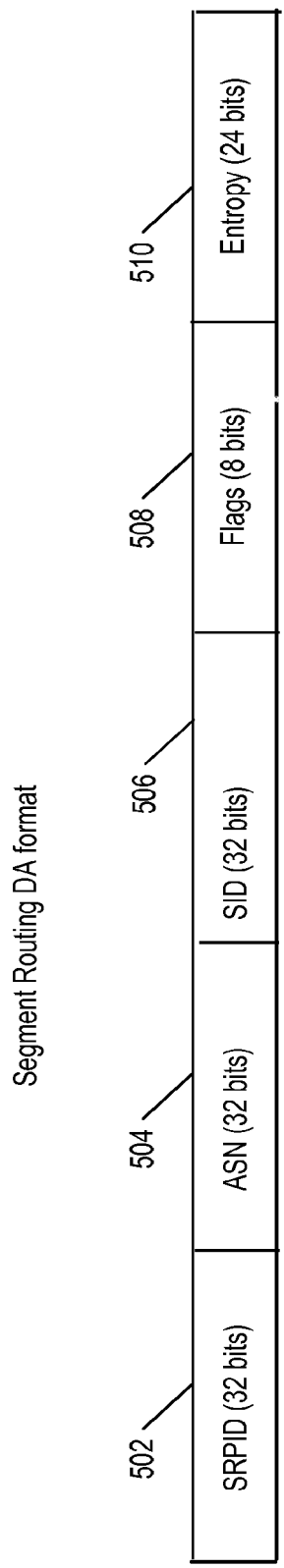
FIG. 5 is a block diagram illustrating an example format for a destination address.

FIG. 5 is a block diagram illustrating an example format for a destination address, e.g., a 128-bit destination address in an IPv6 packet header. FIG. 5 shows an example the destination address when formatted for segment routing. The destination address is written to the destination address field in the fixed IPv6 header, as shown at 202 of FIG. 2. In one embodiment, an SR capable node, such as SR node 108 of FIG. 1 rewrites the destination address to include the values described below.

At 502, the destination address includes a segment routing protocol identifier (SRPID). The SRPID is a 32-bit value that uniquely identifies the packet as an SR packet. That is, a node that examines a destination address and finds an SRPID in the first 32 bits can conclude that the packet is an SR packet and has at least one SR extension header. This improves the speed with which packets containing SR extension headers can be identified. Rather than parsing the entire packet header, a node receiving the packet can determine from the first 32 bits of the destination address whether SR extension headers are present. The SRPID can be globally unique, such as an internet assigned numbers authority (IANA) value. Alternatively, the SRPID can be private, or locally administered value that identifies packets as SR packets.

The destination address includes, at 504, a 16-bit or 32-bit autonomous system number (ASN). If the ASN is 32 bits, the first 16 bits of the ASN field are set to zero. In one embodiment, no ASN is included, and all 32 bits of the ASN field are set to zero. Next, at 506, the destination address includes a 32-bit segment ID. The 32-bit segment ID is unique within the autonomous system if an ASN is present.

The destination address also includes, at 508, 8 bits of flags. The only flag that is defined in 508 is a fast reroute flag. The fast reroute flag is set when the packet has been rerouted using fast reroute. The flag can indicate either that fast reroute was performed on the previous segment, or that fast reroute was performed at any point previously in the packet's path.

At 510, the destination address includes 24 bits of entropy information, which provide load balancing efficiency. For example, if two nodes are connected by multiple links, and packets between the nodes are distributed among the links based on destination address, the entropy bits provide a way of differentiating the destination address values so that packets traversing the same segments (which would otherwise have identical destination addresses) are sent on different links. Since the destination is actually specified by the SID in the destination address field, changing the entropy bits does not affect the path that packets travel, e.g., packets may be forwarded on different links based on a node's detecting different values in the destination address field (due to different entropy-bit values), but the node will still forward the packets to the same destination nodes.

Forwarding a packet using SR in a native IP network can cause the packet to be received by several types of nodes. For example, the node may be received at an ingress node. The ingress node receives the packet from a non-SR node, and prepares the packet to be forwarded using SR. This involves, among other things, inserting a segment list which defines the path to be followed by the packet.

After being forwarded from an ingress node, there are several types of intermediate nodes the packet may be forwarded to between the ingress node and an egress node. One type of intermediate node is a non-SR capable node. A non-SR capable node does not utilize SR, but instead forwards packets based on the node's interpretation of the destination address field of the fixed IPv6 header attached to the packets. Another type of intermediate node is an SR capable node that is a transit node within a segment. This type of node is not the endpoint of a segment. Transit nodes can inspect flags, forward the packet, and, in some cases, update an SR trace extension header. Intermediate nodes that are segment endpoints can also modify the SR extension header to control how the packet is forwarded, as well as updating flags in the SR extension header, updating the SR trace extension header, forwarding the packet, and other operations that are described below. In addition to an ingress node and intermediate nodes, a packet can be forwarded to an egress node, which prepares the packet to exit the SR domain and return to another type of forwarding mechanism, such as IPv6, by stripping some or all of the SR forwarding information from the packet's header.

Figure 6:
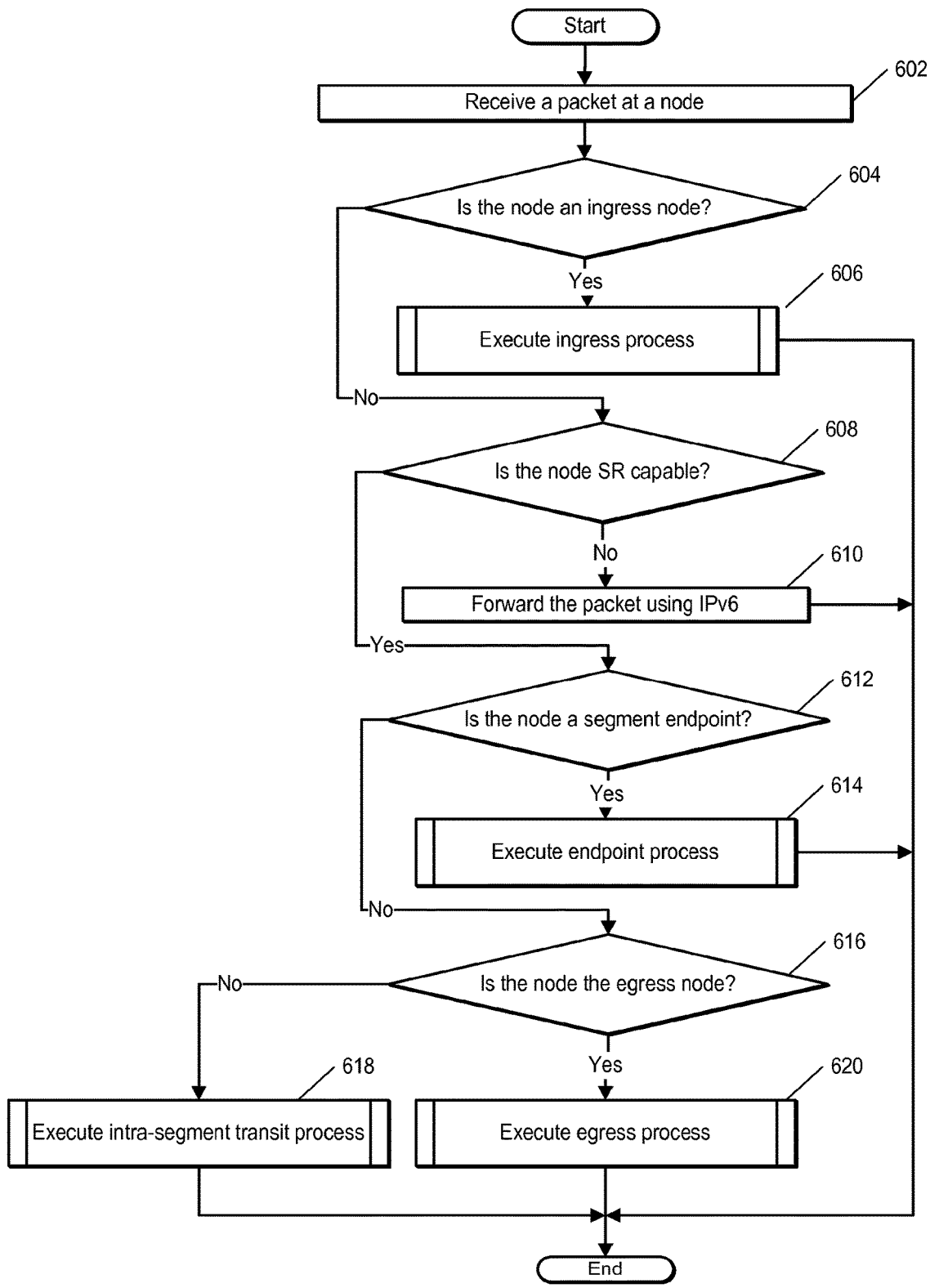
FIG. 6 is a flow chart illustrating an example process employed by a node.

FIG. 6 is a flow chart illustrating an example process employed by a node, such as one of the nodes shown in FIG. 1. At 602, the node receives a packet, such as an IPv6 packet. Upon receipt of the packet, the node determines whether the packet is destined for the node or is just to be forwarded. In one embodiment, the node parses the packet header and locates a destination address. The node then compares the destination address with the node's address to determine whether the node's address matches the destination address. If so, the node determines that the packet is addressed for the node. In some embodiments, only nodes that are the destination of a packet are allowed to examine and/or modify additional portions of the packet header. However, in some cases, SR nodes that are not the destination of a packet are permitted to read and modify extension headers in the packet.

At 604, the node determines whether the node is an ingress node, for example to an SR domain. In one embodiment, this is a configuration setting applied, for example, by a network operator. In such an embodiment, the node can check a flag or register value to determine whether the node is an ingress node. Alternatively, a node can determine whether the node is an ingress node depending on a destination address associated with the packet. For example, a packet arriving at a node having a specific destination address can trigger a table lookup which indicates that for the specific destination address the node is an ingress node, and an ingress process is triggered based upon the node determining that the node is an ingress node for that packet. In response to determining that the node is an ingress node for a given packet, at 606 the node executes the ingress process. The ingress process is discussed in greater with regard to FIG. 7.

If the node is not an ingress node, the node determines, at 608, whether the node is an SR capable node. In one embodiment, this is a configuration setting applied, for example, by a network operator. In such an embodiment, the node can check a flag or register value to determine whether the node is an ingress node. An SR capable node is configured to forward packets based on segment IDs, e.g., using SR forwarding tables. Nodes that are not SR capable may be interoperable with those that are. If the node is not SR capable, the node forwards the packet using IPv6, at 610. In one embodiment, to forward a packet using IPv6, the node reads the destination address in the IPv6 header, looks up an associated egress interface in an IPv6 forwarding table, and forwards the packet to the associated egress interface. If, on the other hand, the node is an SR capable node, the node determines, at 612, whether the node is a segment end point. In one embodiment, this involves the node extracting a segment ID from the destination address of the packet and looking up a node associated with the segment ID in an SR forwarding table. If the segment ID identifies or is associated with the node, then the node is the segment end point for that segment ID. If the node is a segment endpoint, the node executes an end point process, at 614, as discussed in greater detail with regard to FIG. 8.

If the node is not a segment end point as determined at 612, the node determines at 616 whether the node is an egress node. In one embodiment, determining whether the node is an egress node involves the node comparing the node's segment ID with a value stored in the policy list of the SR extension header, for example, the third entry of the policy list which contains, in some embodiments, information identifying the egress node for the SR domain. The node can locate the third entry in the policy list by using an offset stored in the first entry in the policy list field, as well as the length (which is included in the first policy list mule, and then calculating the locations for the second and third entries in the same fashion. In another embodiment, the node examines a flag in a segment routing extension header to determine whether the node is an egress node. In the node is not an egress node, the node executes an intra-segment transit process at 618, as discussed in greater detail with regard to FIG. 9. Otherwise, if the node determines at 616 that the node is an egress node, the node executes an egress process, as discussed in greater detail with regard to FIG. 10.

Figure 7:
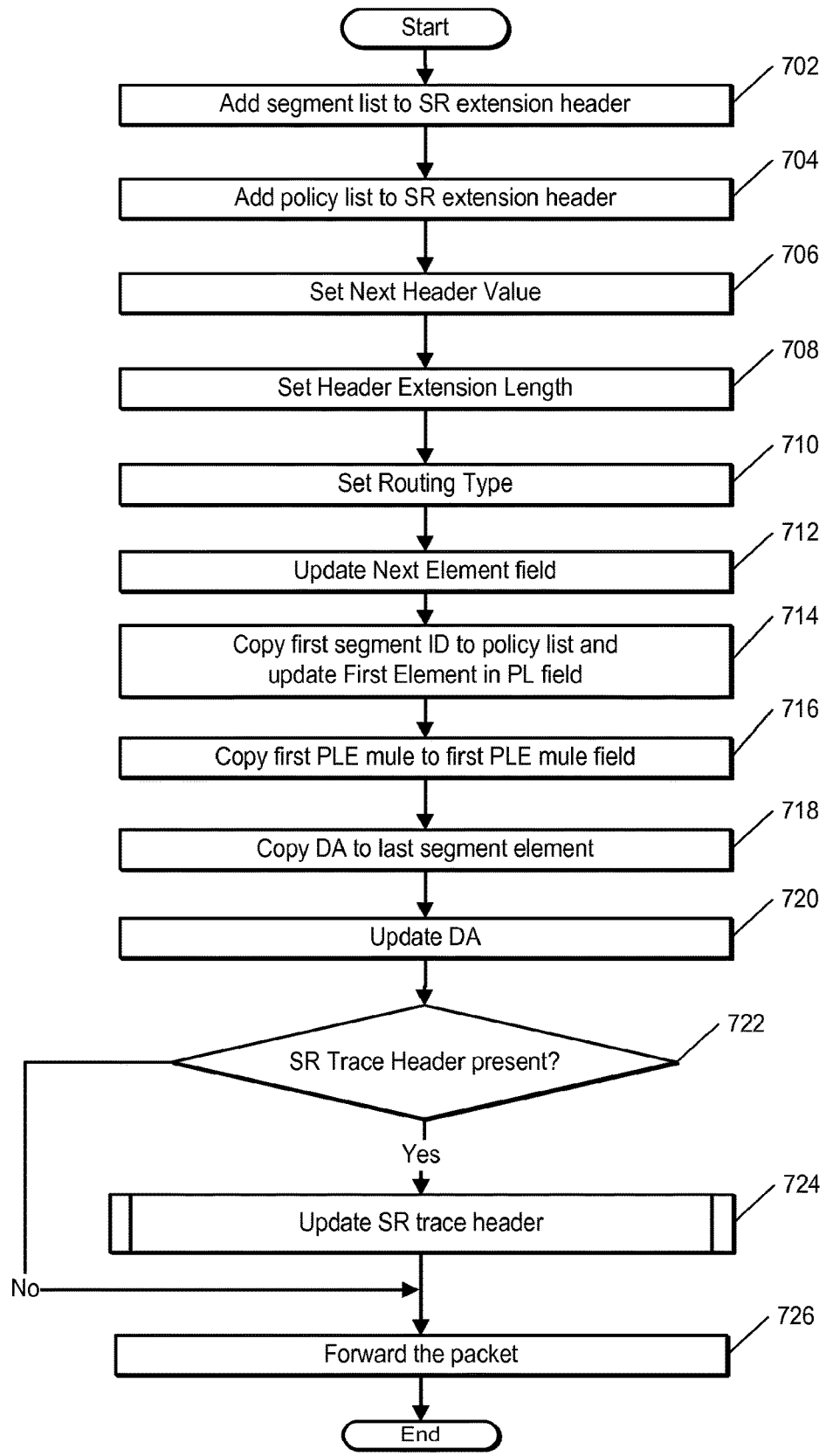
FIG. 7 is a flow chart illustrating an example process employed by a node.

FIG. 7 is a flow chart illustrating an example process employed by a node, such as one of the nodes shown in FIG. 1. The node performs FIG. 7 in response to determining that the node is an ingress node, as shown at 604 of FIG. 6. The ingress node generates a segment routing extension and header and adds the segment routing extension header to the IPv6 packet received at 602 of FIG. 6. The IPv6 specification dictates the location in the IPv6 packet for all IPv6 extension headers. The node can determine if other extension headers are present in the IPv6 packet. If so, the node determine where in the IPv6 packet to insert the segment routing extension header based on the IPv6 specification and the types of extension headers already present (if any). For example, based on the extension header type, the node can insert the SR extension header preceding or following other extension headers in the packet. If no other extension headers are present, the node inserts the SR extension header between the fixed IPv6 header and an upper layer protocol header.

At 702, the node adds a segment list to the segment routing extension header, such as segment list 314 of FIG. 3. In one embodiment, the segment list encodes a path to a destination, such as a destination that the node reads from the packet's IPv6 header destination address. The segment list can include one or more nodal segment identifiers, one or more adjacency segment identifiers, and the like. As described above, each element in the segment list includes a segment ID and may also include additional information, such as an SRPID, an ASN, and the like. The size of each element can vary between 32 bits and 256 bits.

At 704, the node adds a policy list to the segment routing extension header, such as policy list 316 of FIG. 3. As noted, the first policy list entry of the policy list identifies the first segment in the path. That is, the first policy list entry in the policy list includes a segment identifier for the first segment in the segment path and a mule. The second policy list entry in the policy list inserted by the node into the segment routing extension header is a policy list element that identifies the ingress node. The third policy list element of the policy list is the policy list element corresponding to the egress node. In one embodiment, the ingress node and/or egress node policy list entries include IPv6 destination addresses.

At 706, the node sets the next header field in the SR extension header. The next header field is an 8-bit selector that identifies the type of header immediately following the SR extension header. The node examines the header immediately following the SR extension header to determine a type associated with the following header. In one embodiment, the type is included in a field within the following header. In one embodiment, the node modifies a next header value in the SR extension header and also in a preceding extension header if there are additional extension headers in the IPv6 packet. For example, if a previous extension header indicated that the next header was an upper layer protocol header, insertion of the segment routing extension header causes that information to inaccurate. To correct this, the node updates the previous extension header's next header field with a value indicating that the next header is the segment routing extension header. In one embodiment, the node has access to a table indicating the types of headers and extension headers included in the IPv6 packet.

At 708, the node sets the header extension length field in the SR extension header. The header extension length is an 8-bit unsigned integer representing the length of the segment routing extension header in 8-byte units not including the first 8 bytes. In one embodiment, the node calculates the length of the segment routing extension header. For example, the node can determine the number of segment list entries and policy list entries included in the segment routing extension header, can determine the length of each of those entries, and can compute the total length of the segment routing extension header. The node then inserts the total length value into the header extension length field.

At 710, the node sets the routing type value in the segment routing extension header. In one embodiment, the node maintains or has access to a table that includes mappings between various types of routing and values representing those types of routing. The node selects the value associated with SR and inserts the value into the routing type field.

At 712, the node updates the next element field in the segment routing extension header. The next element field represents a pointer, or offset, to the next segment element, which includes a SID associated with the next segment a packet should be forwarded along. When that SID is copied to the destination address of the packet, the next element field is updated to point to the next segment list element in the segment list. In one embodiment, this involves the node computing the length of the segment list element from which the SID is being copied, and adding that value to the value currently in the next element field. In the case of the ingress router, the next element is the first element in the segment list. In this case, the value of the next element field is set to zero. When the packet reaches the destination specified in the destination address of the IPv6 header (the node associated with the first SID in the segment path), the SID associated with the first element is copied into the destination address and the next element field is updated to point to the second segment list element, and so on. The length of the current segment is calculated and added to the next element field so that the next element field specifies an offset into the segment list that corresponds to the beginning of the next segment. In one embodiment, the length is calculated by counting the bytes in the current segment. In another embodiment, the length is calculated by accessing the mule associated with the previous segment. The mule specifies a length and multiplier which the node can use to determine the offset that should be added to the next element in the segment list field. In the case of the first node, the length is available in the first policy list mule, which is included in the SR extension header and identifies the length of the first segment.

At 714, the node copies the first segment identifier to the first element of the policy list and also updates the first element in the policy list field at the top of the segment routing extension header. The segment element associated with the first segment in the path is copied to the first element in the policy list so that the first segment (which is not included in the segment list, but is instead included in the destination address in the fixed IPv6 header) can be easily identified for OAM purposes. To facilitate access to the policy list, an offset, or pointer, value is included in the first element in the policy list field of the SR extension header. The node calculates the length of the segment list, and uses that value as an offset indicating where in the SR extension header the policy list begins. In one embodiment, the node reads the mule for each segment list element and adds the values included therein.

At 716, the node copies the first policy list element's mule to the first policy list element mule field at the top of the segment routing extension header. Doing so facilitates quick access to the length and any flags associated with the first policy element, which is the first segment in the segment path. As the number of bytes which can be processed by hardware, such as one or more CPUs associated with the node, is limited, efforts are made to include important information, e.g., information that is likely to be accessed, towards the front of the packet. This reduces the probability of a second read being used to access the information, and therefore avoids performance degradation.

At 718, the node locates the last segment list element in the segment list and copies the destination address from the IPv6 fixed header destination address field to the last segment list element in the segment list. Preserving the original destination address enables the node to restore to the destination address field in the IPv6 fixed header after the segment routing is complete, e.g., on egress from the SR domain. In one embodiment, the source address in the source address field of the IPv6 header is not changed. In another embodiment, the source address is overwritten with the source address of the ingress node. If the source address is to be overwritten, the source address can first be preserved, e.g., by copying the source address to a segment list element in the segment list or a policy list element in the policy list.

At 720, the node updates the destination address in the IPv6 fixed header. This involves copying the segment identifier corresponding to the first segment in the segment ID stack into the destination address field of the fixed IPv6 header. The node may also write additional information to the destination address field, such as an SRPID, an ASN, and the like.

At 722, the node determines whether a segment routing trace header is present. This involves determining whether the node immediately following the segment routing extension header has a type associated with segment routing trace headers. If so, the node updates the segment routing trace header at 724, as discussed in greater detail with regard to FIG. 13. Subsequent to updating the segment routing trace header, or if no segment routing trace header is present in the packet, the node forwards the packet along the segment path indicated by the segment ID stack. In one embodiment, this involves the node accessing the SID included in the destination address of the packet, identifying an egress interface associated with the SID, e.g., by performing a lookup in an SR forwarding table, and sending the packet to the identified egress interface.

Figure 8:
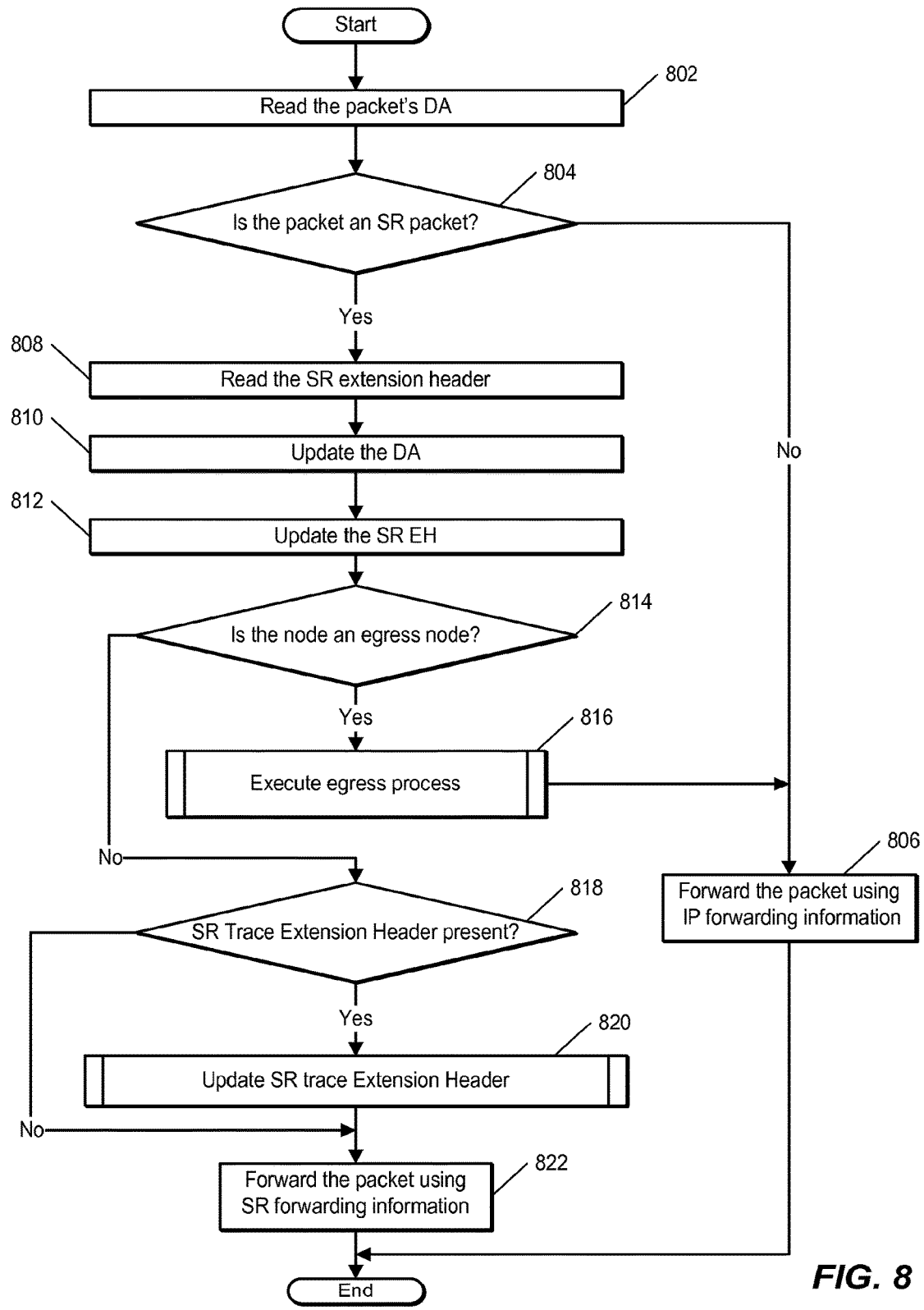
FIG. 8 is a flow chart illustrating an example process employed by a node.

FIG. 8 is a flow chart illustrating an example process employed by a node, such as one of the nodes shown in FIG. 1. In response to receiving a packet, as shown for example at 602 of FIG. 6, a node determines whether the node is an end point of the segment the packet is following. For example, the node determines whether the packet is addressed to the node. In one embodiment, routing headers are not examined until the packet reaches the node specified in the destination address. In another embodiment, nodes that are not indicated in the destination address of the packet are allowed to modify and examine the extension headers in the packet.

At 802, the node reads the packet's destination address from the destination address field of the fixed IPv6 header. The SID associated with the packet is encoded in the destination address of the header. The node decodes the destination address and compares the SID in the destination address with the node's address. If the two are identical, the packet is destined for the node, and the node is the endpoint of the segment the packet is travelling (or has just travelled).

The node determines at 804 whether the packet is an SR packet. In one embodiment, this involves the node detecting that the destination address of the packet includes a segment routing protocol ID, an autonomous system number, and/or a segment ID in the destination address. If the node determines that the packet is not an SR packet, the node forwards the packet using IP forwarding information at 806. In one embodiment, forwarding a packet using IPv6 involves the node reading the destination address in the IPv6 header, looking up an associated egress interface in an IPv6 forwarding table, and forwarding the packet to the associated egress interface.

If the node determines that the packet is an SR packet, at 808 the node reads the segment routing extension header. In one embodiment, this involves determining the next element in the segment list. The node can determine the next element in the segment list by accessing a pointer in the header, such as the next element in the segment list field as shown at 308 of FIG. 3. The node can read the pointer and determine, based on the information in the pointer, what the next segment in the segment list is. At 810, the node updates the destination address in the fixed IPv6 header of the packet. In one embodiment, this involves writing an address to the destination address field that includes a segment ID read from the next element in the segment list.

Updating the destination address at 810, in one embodiment, involves checking the segment list element length, e.g., by reading the length in the mule of the preceding segment list element. If the length is 32 bits, the node extracts the 32-bit segment identifier and copies the segment identifier into the segment identifier field of the destination address. If the segment list element length is 64 bits, the node extracts an autonomous system number and the segment identifier and copies the autonomous system number and segment identifier to their respective fields in the destination address. If the next segment identifier is encoded as 128-bit address, the node extracts the 128-bit segment identifier (e.g., an IPv6 address) and copies the entire address into the destination address. If the next segment identifier is encoded as a 256-bit address, the node extracts 128 bits (e.g., the second 128 bits, which correspond to an IPv6 destination address) and copies the entire address into the destination address.

At 812, the node updates the segment routing extension header. In one embodiment, this involves updating the next element in the segment list to point to the next element in the segment list. To calculate the new offset to be included in the next element field, the node reads the length value in the mule associated with the previous segment list element (e.g., the segment list element corresponding to the segment for which the node is the endpoint) and adds the length value to the offset in the next element field, such that the next segment list element field points to the segment list element in the segment list that will next be inspected and it represents the next segment.

At 814, the node determines whether the node is an ingress node. In one embodiment, this involves the node comparing the incoming destination address with the last field with the policy list. In another embodiment, this involves the node determining that there is only one remaining element in the segment list. That is, the last segment list element in the segment list includes the destination address that was included in the packet when the packet arrived at an ingress node the SR domain. If the node detects, at 814, that the node is an egress node, the node executes an egress process at 816. The details of executing an egress process are discussed in greater detail with regard to FIG. 10. Subsequent to executing the egress flow, the node forwards the packet using IPv6, at 806.

If the node detects that the node is not an egress node, the node determines, at 818, whether a segment routing trace extension header is present in the packet. In one embodiment, this involves the node examining the next header type field, as shown at 302 of FIG. 3. If the next header indicates that the next header type value is a value that the node recognizes as being associated with the segment routing trace extension header, then the node concludes that a trace extension header is present in the packet. In this case, the node updates the segment routing trace extension header at 820. Additional details regarding updating trace extension header are discussed with regard to FIG. 13.

At 822, the node forwards the packet using SR forwarding information. In one embodiment, this involves the node accessing the SID included in the destination address of the packet, identifying an egress interface associated with the SID, e.g., by performing a lookup in an SR forwarding table, and sending the packet to the identified egress interface.

Figure 9:
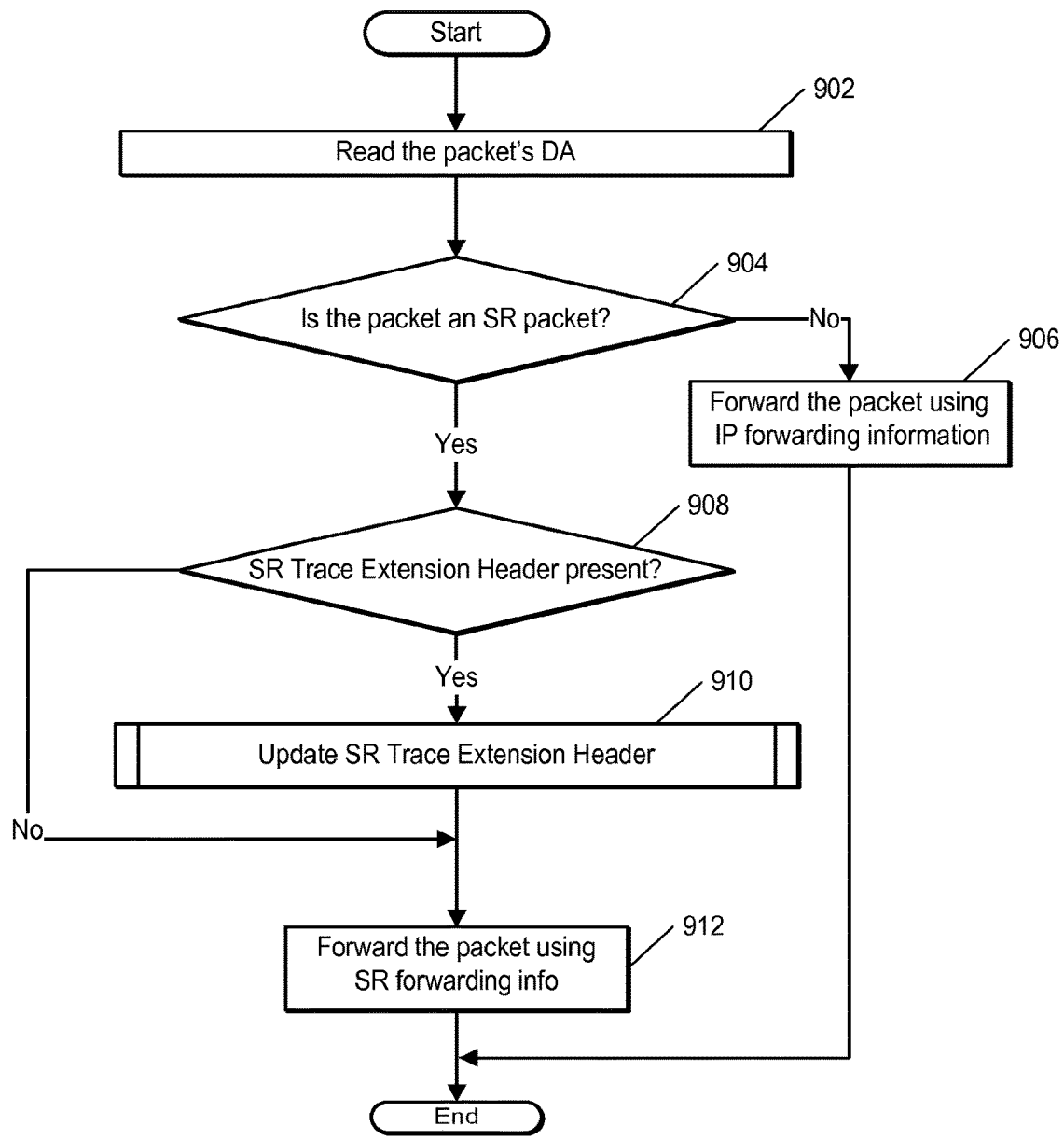
FIG. 9 is a flow chart illustrating an example process employed by a node.

FIG. 9 is a flow chart illustrating an example process employed by a node, such as one of the nodes shown in FIG. 1, in response to receiving a packet, as shown at 602 of FIG. 6. In one embodiment, steps of FIG. 9 are performed by a node that is a transit node within a segment. That is, the node that performs the steps of FIG. 9 is an SR capable node that is not a segment end point.

At 902, the node reads the packet's destination address as described above with regard to FIG. 8. If the node determines that the packet is not an SR packet, the node forwards the packet using an IP forwarding information at 906. In one embodiment, forwarding a packet using IPv6 involves the node reading the destination address in the IPv6 header, looking up an associated egress interface in an IPv6 forwarding table, and forwarding the packet to the associated egress interface.

If the node determines that the packet is an SR packet, the node determines at 908 whether the packet includes an SR trace extension header. In one embodiment, this involves the node examining the next header type within the SR extension header, for example, as shown in 302 of FIG. 3. If the next header indicates that a trace extension header is present in the packet, the node updates the segment routing extension trace header at 910. Additional details regarding updating a trace extension header are discussed with regard to FIG. 13. At 912, the node forwards the packet using segment routing forwarding information. In one embodiment, this involves the node accessing the SID included in the destination address of the packet, identifying an egress interface associated with the SID, e.g., by performing a lookup in an SR forwarding table, and sending the packet to the identified egress interface.

Figure 10:
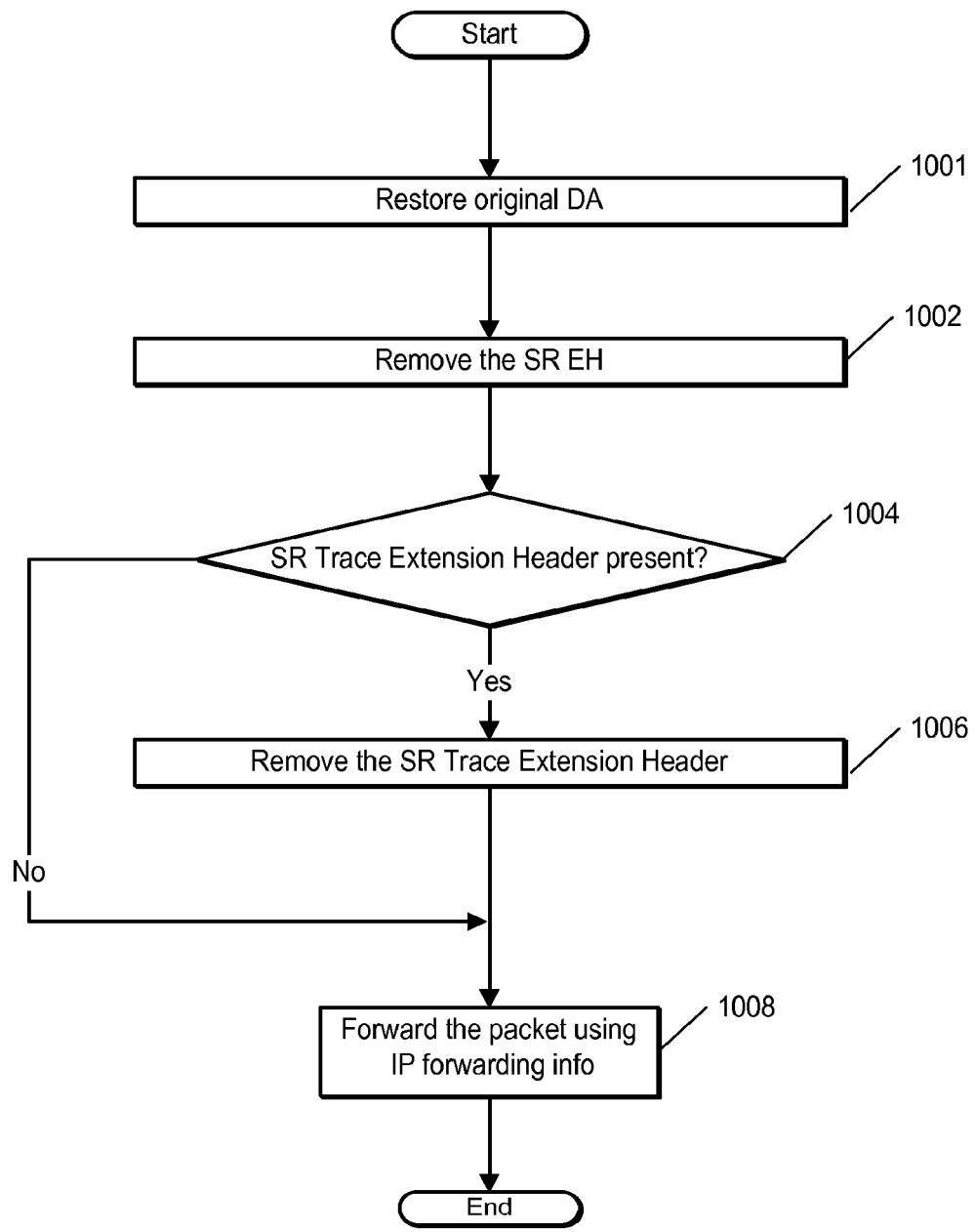
FIG. 10 is a flow chart illustrating an example process employed by a node.

FIG. 10 is a flow chart illustrating an example process employed by a node, such as one of the nodes shown in FIG. 1, in response to receiving a packet, as shown at 602 of FIG. 6. In response to detecting that the node is an egress node, for example as shown at 616 of FIG. 6, the node performs the method of FIG. 10. The node restores the original destination address at 1001. In one embodiment, this involves the node locating the last segment list element in the segment list. This can be accomplished via the offset in the next element in the segment list field. Next, the node copies the 128-bit IPv6 address stored in the last segment list element to the destination address field of the packet. At 1002, the node removes the segment routing extension header from the packet. At 1004, the node detects whether a segment routing trace extension header is present. If so, the node removes the segment routing trace extension header at 1006. At 1008, the node forwards the packet using IP forward information, as described above.

Figure 11:
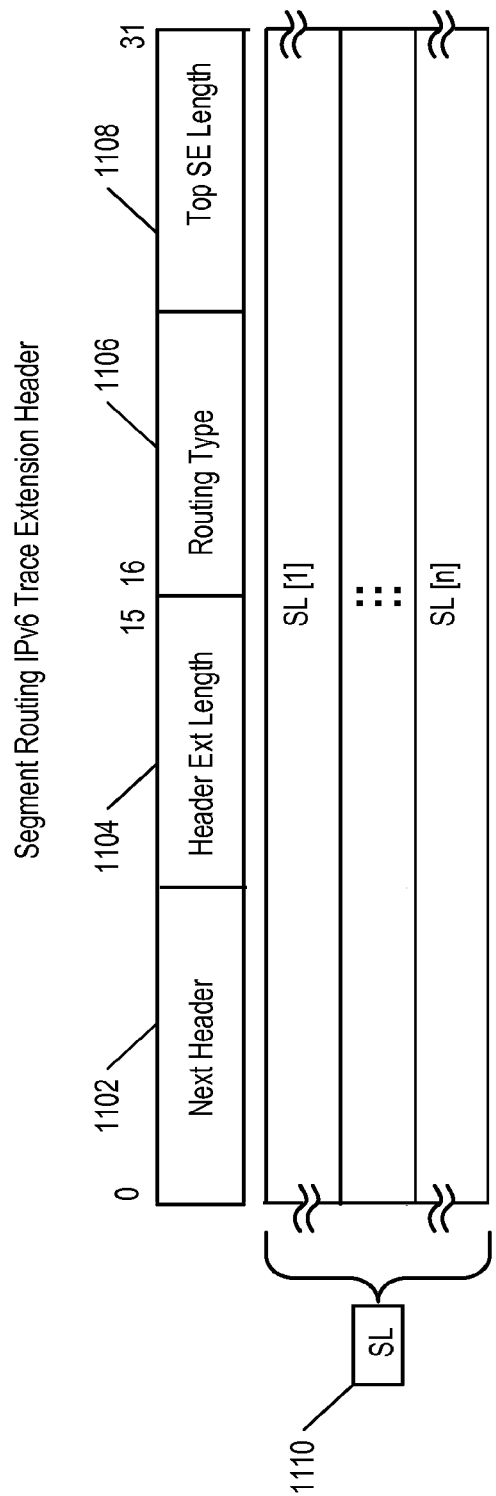
FIG. 11 is a block diagram illustrating an example SR trace extension header.

FIG. 11 shows an example of a segment routing IPv6 trace extension header. The header can be used to perform OAM functions for packets forwarded using segment routing. The header includes a next header field 1102, a header extension length field 1104, and a routing type field 1106. These fields are specified by the IPv6 specification and correspond to fields 302 through 306 of FIG. 3.

The header also includes a top segment element length field at 1108 and a segment list 1110. The top segment element length field is an 8-bit field that gives the length of the top element in the segment stack. The first four bits are reserved. Following the four reserved bits is a length multiplier bit. If the length multiplier bit is not set, then the 3-bit value in the length portion of the field refers to 4-byte multiples. If the length multiplier bit is set, then the three bits of the length field refer to 16-byte multiples. Following the multiplier bit are three length bits. The length bits specify the length of the top segment element in either 4 or 16-byte multiplies, depending on whether or not the multiplier bit is set.

The segment list in the SR trace header works like a stack. As a packet traverses nodes in the path specified by the SR extension header, the nodes push segment elements onto the top of the segment list. Each node that is authorized to modify the trace extension header can push its segment element onto the segment list 1110. In this way, a record is created of which nodes a packet carrying a segment routing trace extension header has traversed. Each of the segment elements in segment list 1110 also includes a mule field, as discussed in greater with regard to FIG. 12. The nodes which update the trace extension header can update the fields of the mule as well. In one embodiment, only nodes that are the endpoint of a segment are configured to update the trace extension header, while in other embodiments, any SR capable node is configured to update the trace extension header.

Figure 12A:
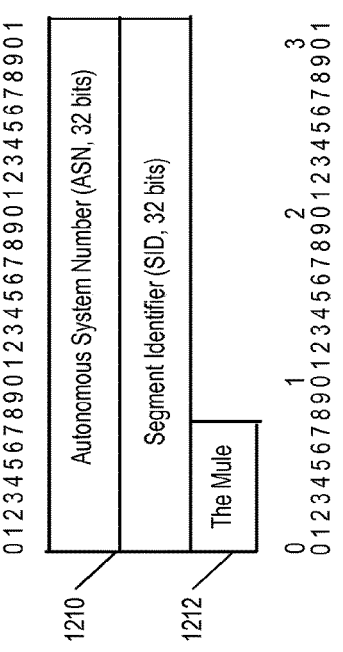
FIGS. 12A-12F show additional details regarding an example SR trace extension header.

FIGS. 12A-12F show additional details regarding segment list elements included in a segment list of an example SR trace extension header, as shown at 1110 of FIG. 11. For example, FIG. 12A shows an example of a segment list element having two fields, a segment identifier 1202, and a mule at 1204.

Figure 12B:
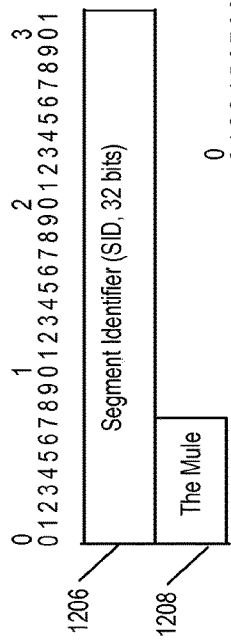
Figure 12C:
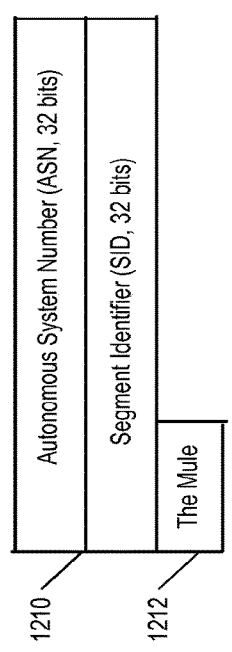
Figure 12D:
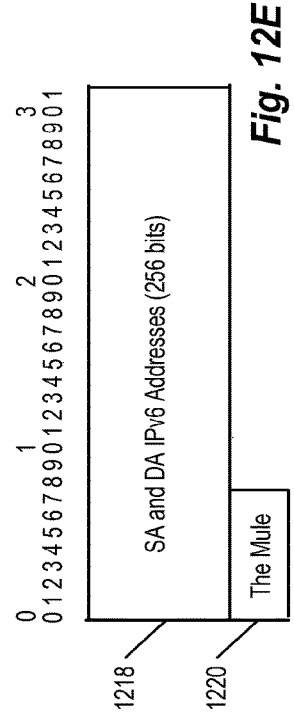
Figure 12E:
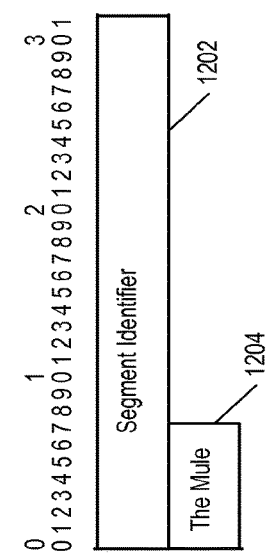

FIG. 12B shows an example where the segment list element includes a 32-bit segment identifier at 1206 and an 8-bit mule at 1208. FIG. 4C shows an example where the segment list element includes a 32-bit segment identifier and a 32-bit autonomous system number, at 1210. The segment list element also includes, at 1212, a mule. FIG. 12D shows, at 1214, a 128-bit IPv6 address. At 1216, the segment list element shown in FIG. 12D includes attached 8-bit mule. FIG. 12E shows an example where, at 1218, a 256-bit field is included in the segment list element. A 256-bit field includes an IPv6 source address and an IPv6 destination address, both of 128 bits. At 1220, the mule attached to the 256-bit segment element is shown.

Figure 12F:
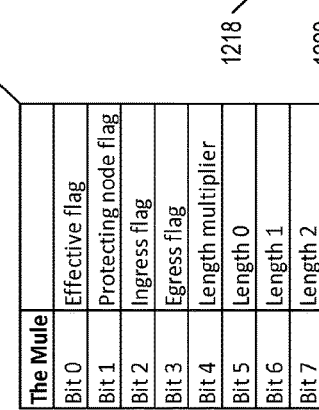

FIG. 12F shows additional details of the mule attached to the segment list element, such as mule 1204. The mule contains flags related to the segment element the mule is a part of. The mule also contains the length of the next segment element entry. One byte of the mule is used as follows. There are 5 bits of flags. The first bit, bit zero, is an effective flag. This bit is set by a node in response to the node detecting that the packet is transmitted, or forwarded, by the node. The second bit, bit 1, is a protecting node flag. The node sets this bit when the node has done fast rerouting protection, e.g., in response to detecting a failure. The third bit, bit 2, is an ingress flag. When set, the segment identifier associated with this segment element identifies an ingress node. The fourth bit, bit 3, is an egress flag. When set, the segment identifier associated with this segment element identifies an egress node. The fifth bit, bit 4, is a length multiplier. When not set, the 3 bits of length, in the length field of the byte of flags in the mule refer to 4-byte multiples. When set, the 3 bits of length refer to 16-byte multiples. The last 3 bits of the mule, bits 5-7, encode a value that represents the length of the next segment element. The 3 bits of length are a value which is multiplied by either 4 or 16 depending on whether the length bit is set. The length value is set to zero in the last element of the list.

Figure 13:
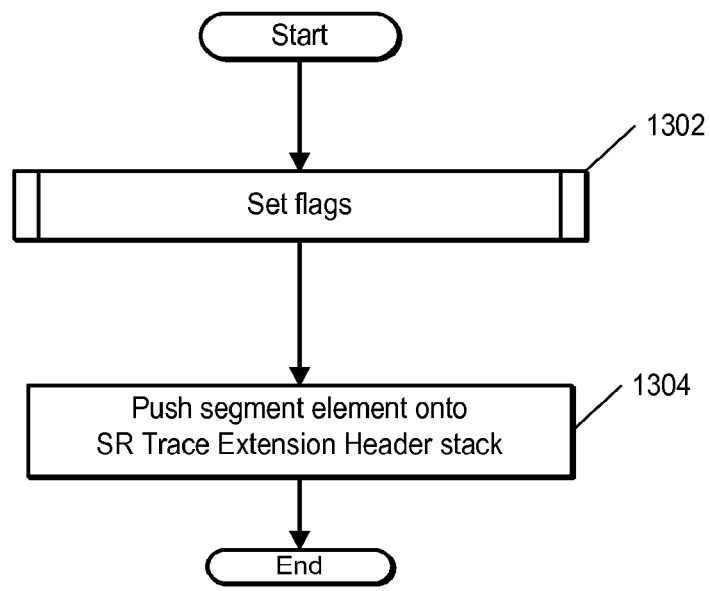
FIG. 13 is a flow chart illustrating an example process employed by a node.

FIG. 13 is a flow chart illustrating an example process employed by a node, such as one of the nodes shown in FIG. 1, in response to receiving a packet, as shown at 602 of FIG. 6. The node performs the operations in response to detecting that a trace extension header is present in the packet. At 1302, the node sets the flags in the mule of a segment list element corresponding to the node in the trace extension header. Additional details regarding this are provided with regard to FIG. 14. At 1304, the node pushes a segment list element onto the segment routing trace extension header stack. In one embodiment, the segment element corresponds to the segment that is currently being traversed by the packet, or which has just been traversed by the packet (e.g., in the example in which the node is a segment endpoint).

Figure 14:
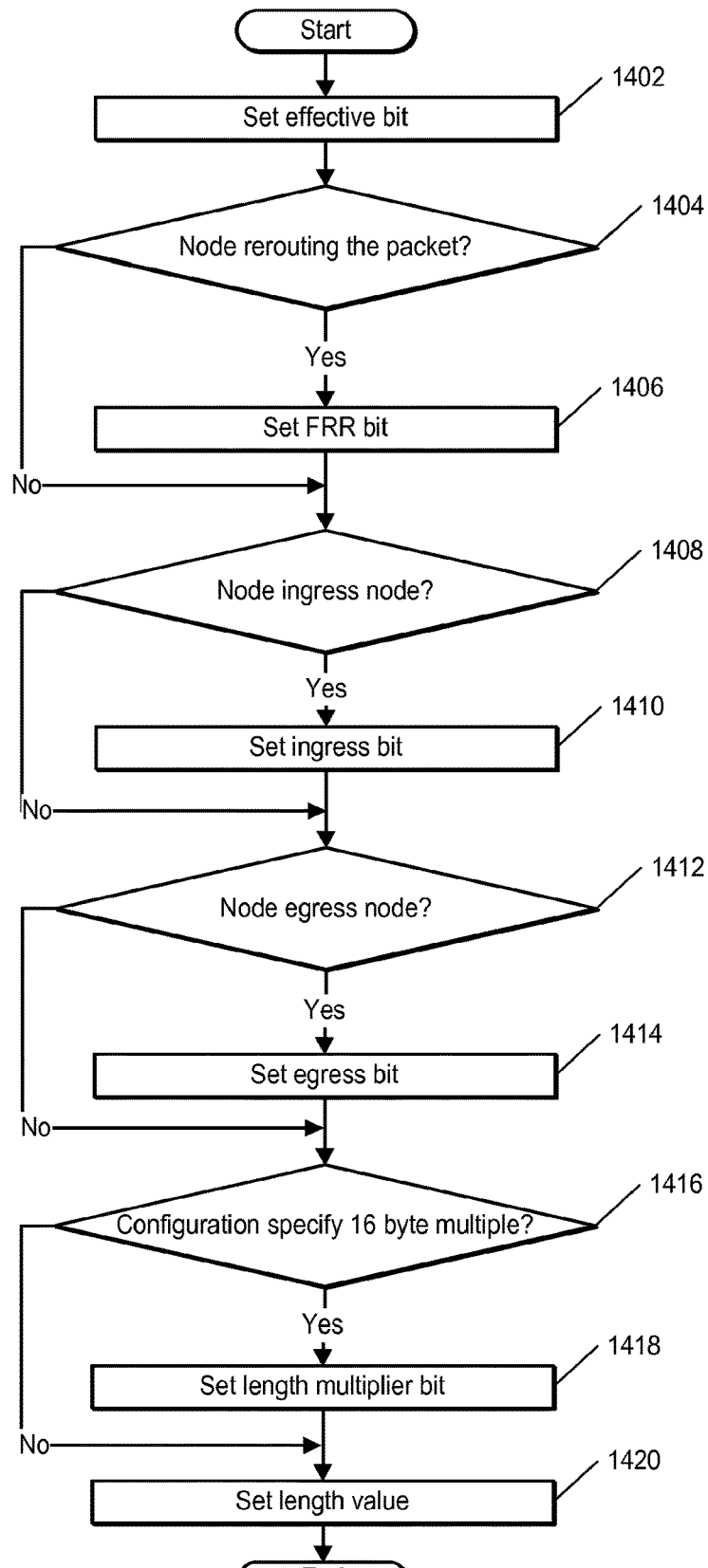
FIG. 14 is a flow chart illustrating an example process employed by a node.

FIG. 14 is a flow chart illustrating an example process employed by a node, such as one of the nodes shown in FIG. 1, in response to receiving a packet, as shown at 602 of FIG. 6 and determining that there is a trace extension header that should be updated.

At 1402, the node sets the effective bit of the mule in the trace extension header. This indicates that the node has effectively transited the packet. At 1404, the node determines whether the node will be rerouting the packet. In one embodiment, this involves detecting whether a reroute condition exists and whether reroute backup paths have been computed. If the node is rerouting the packet, the node sets the fast reroute bit, at 1406.

Otherwise, the node determines whether the node is an ingress node at 1408. In one embodiment, this involves examining an ingress flag in a segment routing extension header. In another embodiment, the node can compare a segment ID associated with the node with a segment ID included in the second element of the policy list of an SR extension header included in the packet, such as the SR extension header shown in FIG. 3. If the node determines that the node is an ingress node, the node sets the ingress bit in the trace extension header's mule at 1410.

At 1412, the node determines whether the node is an egress node. In one embodiment, this involves determining that the next element field in a segment routing extension header points to the last element of the segment list. In another embodiment, this involves comparing a segment ID associated with the node with a segment ID included in the third element of the policy list of an SR extension header included in the packet, such as the SR extension header shown in FIG. 3. If the node determines that the node is a egress node, at 1414, the node sets the egress bit in the trace extension header's mule.

At 1416, the node determines whether 4 or 16-byte multipliers should be applied to the length field of the mule. In one embodiment, this involves accessing a configuration value specified by, for example, an operator. If the configuration specifies that a 16-byte multiplier should be used, the node sets a length multiplier bit at 1418. At 1420, the node sets the three bit length value in the trace extension header's mule. In one embodiment, this involves calculating (e.g., by counting bytes) a length for the segment element directly under the segment element with which the mule is associated in the segment list.

Figure 15:
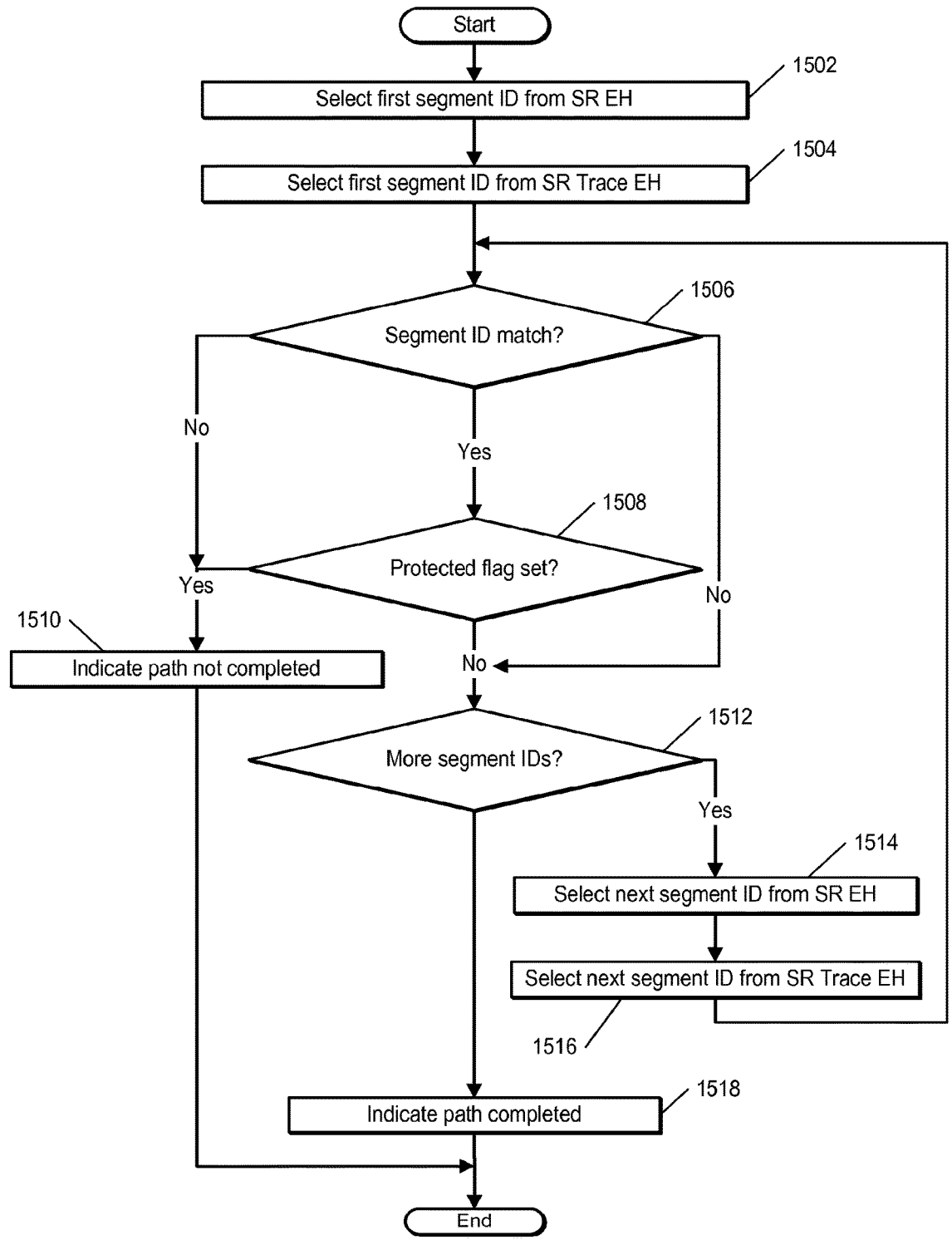
FIG. 15 is a flow chart illustrating an example process employed by a node.

FIG. 15 is a flow chart illustrating an example process employed by a node, such as one of the nodes shown in FIG. 1. FIG. 15 can also be performed by a testing module. At 1502, the node selects a first segment ID from the segment routing extension header. In one embodiment, this involves selecting the first policy element from the policy list. At 1504, the node selects a first segment ID from the segment routing trace extension header. In one embodiment, this involves selecting the bottom most segment ID on the stack included in the segment routing trace extension header. In both 1502 and 1504, the node may extract the segment ID from the segment list element or policy list element.

At 1506, the node compares the segment ID from the extension header with the segment ID from the trace header to determine whether the segment IDs match. If the segment IDs are identical, this means that a node recorded (by pushing its segment ID onto the trace extension header) the packet transiting the node that the packet was intended to transit based on the segment list in the segment routing extension header with segment list. At 1508, the node determines whether the protected flag is set, for example in a trace extension header mule. If so, this means that while the packet transited the node intended it did so as a result of having been rerouted. If the packet was rerouted, the node indicates, at 1510, that the path was not completed and the method ends.

Otherwise, the node determines, at 1512 whether more segment IDs exist in the segment list in the segment routing extension header. If so, at 1514, the node selects segment ID from the segment routing extension header. At 1516, the node selects the next segment ID from the segment routing trace extension header. The method repeats iteratively until the node detects that no more segment IDs remain in the segment list included in the segment routing extension header. At 1518, the node indicates that the path was successfully completed.

FIGS. 16A-16E illustrate an example use case based on, for example, the network shown in FIG. 1. FIG. 16A shows information related to the state of a packet at node A. In one embodiment, the packet can arrive at node A from a host, which generated the packet, and be destined for node Z. Node A writes its own address into the source address field of the packet and writes Z into the destination address field of the packet. Both the address A and the address Z are represented by 128-bit values in the source address field and destination address field, respectively, of the fixed IPv6 header of the packet. At this point, no segment routing extension header or segment routing trace extension header are present.

As the destination address in the packet is Z, node A forwards the packet towards the destination address, namely to node B. As shown in FIG. 16B, the source address is left unmodified, though in one embodiment it is overwritten with an address representing node B. Node B, which represents an ingress node to the SR domain, overwrites the destination address with a destination address representing a segment identifier to node C. The format of the destination address is, in one example, as shown in FIG. 5. That is, the destination address can include a 32-bit segment identifier, a 32-bit SRPID, and a 32-bit ASN. Node B, as the ingress node to the SR domain, also generates a segment routing extension header, and inserts the segment routing extension header in the appropriate place in the packet. For example, node B pushes the SR extension header into the packet as shown at FIG. 204 of FIG. 2. The SR extension header includes, among other fields (not shown), a segment list comprising segment list elements 1-3, and a policy list, including policy list elements 1-3. Since node C's segment identifier has been put into the destination address of the packet, node D is the next segment in the path. A segment identifier representing node D is encoded in segment list element 1. Segment list element 1 also includes a mule, which includes information specifying the length of segment list element 2. The segment routing extension header also includes an offset value (e.g., the next element in the SL field) which indicates that segment list element 1 is the next segment list element the packet should traverse. This is represented by the arrow pointing to segment list element 1. After the packet reaches node D, the next segment to be traveled by the packet ends at node E. A segment identifier for this segment is encoded in segment list element 2. Segment list element 2 also includes a mule which includes the length of segment list element 3. Following the segment to node E is segment list element 3, which includes the original destination address Z.

For purposes of OAM, policy list element 1 includes the first segment being traveled by the packet. Policy list element 1 also includes a mule which includes the length of policy list element 2. Policy list element 2 includes a segment identifier for node B, which is the ingress node. Policy list element 2 also includes a length value for policy list element 3. Policy list element 3 includes a segment identifier for node E, which is the egress node for the segment routing domain.

Also shown in FIG. 16B, is a trace extension header. Node B inserts the trace extension header into the packet. In one embodiment, node B inserts the trace extension header immediately following the segment routing extension header in the packet, for example, at 206, as shown in FIG. 2. Node B also pushes a first segment list element onto a stack included in the trace extension header. Segment list element 1 includes a segment identifier for Node B. Node B also updates the mule to set the flags indicating that the packet was effectively transmitted and whether or the not the packet was rerouted.

FIG. 16C shows operations performed when the packet arrives at node C. Node C updates the destination address with a segment identifier extracted from the active segment, which was indicated by the offset to element 1. Thus, node C writes the segment identifier representing node D to the destination address of the packet. Node C also updates the next element pointer, for example 308, of FIG. 3, to point to the next segment list element in the segment routing extension header. In this example, the offset points the segment list element 2. Node C also updates the trace extension header by pushing the segment identifier representing node C onto the stack. The segment list element also includes a mule which includes the length of segment list element 1. Node C also updates the mule to set the flags indicating that the packet was effectively transmitted and whether or the not the packet was rerouted.

FIG. 16D shows what happens when the packet arrives at node D. Node D updates the destination address with the extracted segment ID from the active segment, which corresponds to node E. Node E also updates the segment routing extension header next element offset to point to the next element in the segment routing extension header, which is segment list element 3. Node E also updates the trace extension header by pushing the segment identifier corresponding to bode D onto the stack, and updating the mule associated with the segment list element identifier to reflect the length of segment list element 2. Node D also updates the mule to set the flags indicating that the packet was effectively transmitted and whether or the not the packet was rerouted.

Figure 17:
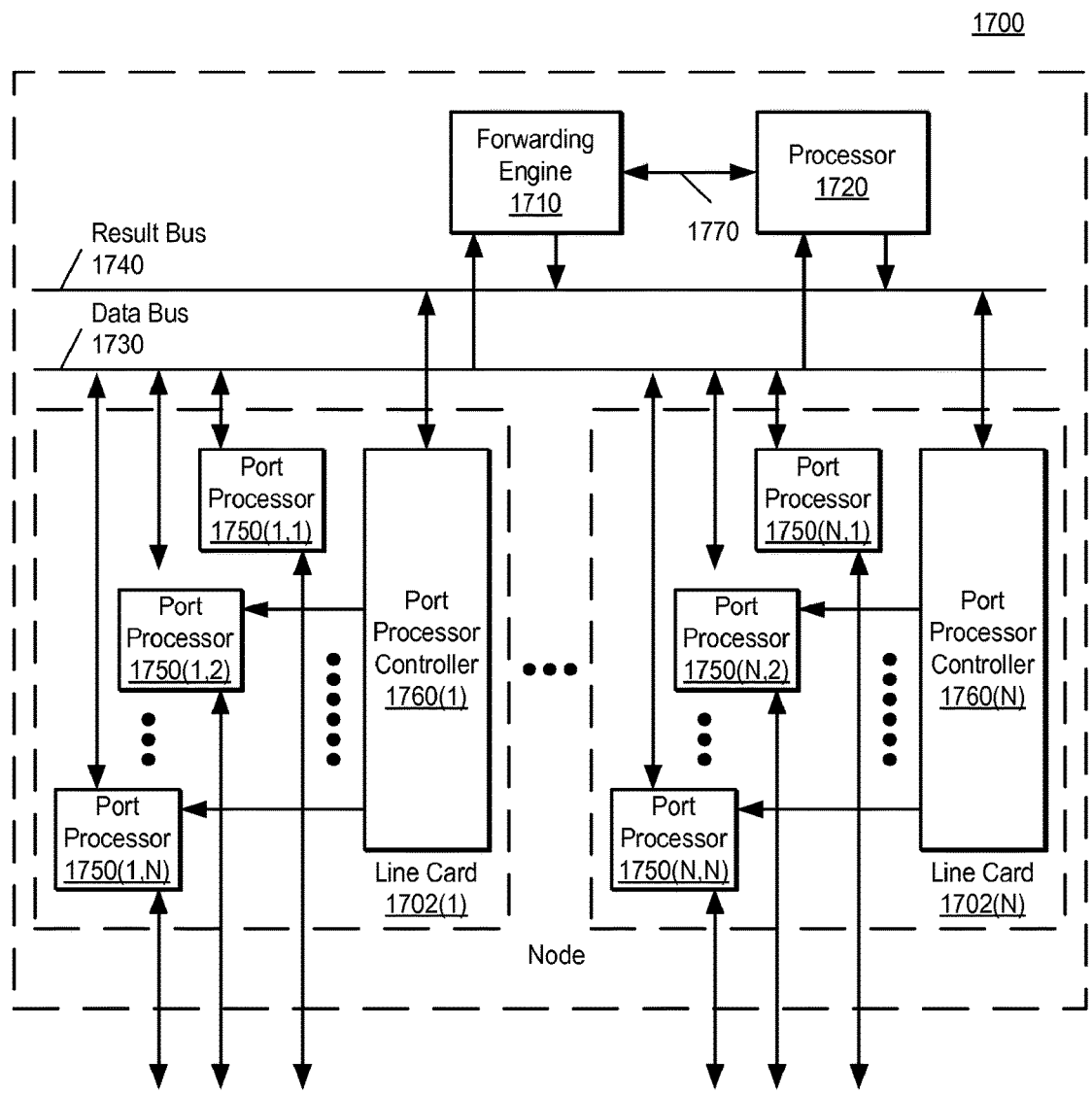
FIG. 17 is a block diagram illustrating certain components of an example node that can be employed in the network of FIG. 1.

At FIG. 16E, the packet arrives at node E, which is the egress node for the segment routing domain. In response to the node determining that the node is the segment routing domain egress node, the node restores the original destination address Z. The node also removes the segment routing extension header and trace extension header from the packet.
Example Node FIG. 17 is a block diagram illustrating certain additional and/or alternative components of nodes that can be employed in the network shown in FIG. 1. In this depiction, node 1700 includes a number of line cards (line cards 1702(1)-(N)) that are communicatively coupled to a forwarding engine or packet forwarder 1710 and a processor 1720 via a data bus 1730 and a result bus 1740. Line cards 1702(1)-(N) include a number of port processors 1750(1,1)-(N,N) which are controlled by port processor controllers 1760(1)-(N). It will also be noted that forwarding engine 1710 and processor 1720 are not only coupled to one another via data bus 1730 and result bus 1740, but are also communicatively coupled to one another by a communications link 1770.

The processors 1750 and 1760 of each line card 1702 may be mounted on a single printed circuit board. When a packet or packet and header are received, the packet or packet and header may be identified and analyzed by router 1700 in the following manner. Upon receipt, a packet (or some or all of its control information) or packet and header is sent from the one of port processors 1750(1,1)-(N,N) at which the packet or packet and header was received to one or more of those devices coupled to data bus 1730 (e.g., others of port processors 1750(1,1)-(N,N), forwarding engine 1710 and/or processor 1720). Handling of the packet or packet and header can be determined, for example, by forwarding engine 1710. For example, forwarding engine 1710 may determine that the packet or packet and header should be forwarded to one or more of port processors 1750(1,1)-(N,N). This can be accomplished by indicating to corresponding one(s) of port processor controllers 1760(1)-(N) that the copy of the packet or packet and header held in the given one(s) of port processors 1750(1,1)-(N,N) should be forwarded to the appropriate one of port processors 1750(1,1)-(N,N). In addition, or alternatively, once a packet or packet and header has been identified for processing, forwarding engine 1710, processor 1720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Node 1700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to node 1700 for storage in memory via a network such as the Internet or upon a carrier medium.

The computer-readable medium containing the computer program may be loaded into node 1700. All or a portion of the computer program stored on the computer-readable medium may then be stored in system memory and/or various portions of storage devices coupled to node 1700 (not shown). When executed by processor 1720, a computer program loaded into node 1700 may cause processor 1720 to perform and/or be a means for performing the functions of one or more of the embodiments described and/or illustrated herein. Additionally or alternatively, one or more of the embodiments described and/or illustrated herein may be implemented in firmware and/or hardware.

Although the present disclosure has been described with respect to specific embodiments thereof, various changes and modifications may be suggested to one skilled in the art. It is intended such changes and modifications fall within the scope of the appended claims.

What is claimed is:

1. A method comprising:
   receiving a packet at a node, wherein the packet comprises an internet protocol (IP) header, which comprises a first extension header, wherein the first extension header comprises a first list of elements, wherein each of the elements in the first list comprises a respective segment identifier (SID);
   updating the packet, wherein the updating comprises adding a new element to the first list of elements;
   wherein the new element comprises a segment identifier (SID) that identifies the node.

2. The method of claim 1 wherein the packet comprises a second extension header, wherein the second extension header comprises a second list of elements, wherein each element of the second list comprises a respective SID.

3. The method of claim 2 further comprising:
   selecting a first element from the first list;
   selecting a first element from the second list;
   comparing a SID of the first element selected from the first list to a SID of the first element selected from the second list.

4. The method of claim 3 further comprising:
   in response to determining that the SID of the first element selected from the first list compares equally to the SID of the first element selected from the second list:
   selecting a second element from the first list;
   selecting a second element from the second list;
   comparing a SID of the second element selected from the first list to a SID of the second element selected from the second list;
   setting a bit in response to determining that the SID of the second element selected from the first list does not compare equally to SID of the second element selected from the second list.

5. The method of claim 4 wherein the bit, when set, indicates that the packet was rerouted through a network.

6. The method of claim 3 further comprising:
   in response to determining that the SID of the first element selected from the first list compares equally to the SID of the first element selected from the second list:
   selecting a second element from the first list;
   selecting a second element from the second list;
   comparing a SID of the second element selected from the first list to a SID of the second element selected from the second list;
   setting a bit to indicate that a path taken by the packet through was completed in response to determining that the SID of the second element selected from the first list compares equally to SID of the second element selected from the second list.

7. A non-transitory computer readable memory (CRM) comprising instructions that are executable by a processor of a node in a network, wherein a method is implemented in response to executing the instructions, the method comprising:
   receiving a packet at the node, wherein the packet comprises an internet protocol (IP) header, which comprises a first extension header, wherein the first extension header comprises a first list of elements, wherein each of the elements in the first list comprises a respective segment identifier (SID);
   updating the packet, wherein the updating comprises adding a new element to the first list of elements;
   wherein the new element comprises a segment identifier (SID) that identifies the node.

8. The non-transitory CRM of claim 7 wherein the packet comprises a second extension header, wherein the second extension header comprises a second list of elements, wherein each element of the second list comprises a respective SID.

9. The non-transitory CRM of claim 8 wherein the method further comprises:
   selecting a first element from the first list;
   selecting a first element from the second list;
   comparing a SID of the first element selected from the first list to a SID of the first element selected from the second list.

10. The non-transitory CRM of claim 9 wherein the method further comprises:
    in response to determining that the SID of the first element selected from the first list compares equally to the SID of the first element selected from the second list:
    selecting a second element from the first list;
    selecting a second element from the second list;
    comparing a SID of the second element selected from the first list to a SID of the second element selected from the second list;
    setting a bit in response to determining that the SID of the second element selected from the first list does not compare equally to SID of the second element selected from the second list.

11. The non-transitory CRM of claim 10 wherein the bit, when set, indicates that the packet was rerouted through the network.

12. The non-transitory CRM of claim 9 wherein the method further comprises:
    in response to determining that the SID of the first element selected from the first list compares equally to the SID of the first element selected from the second list:
    selecting a second element from the first list;
    selecting a second element from the second list;

comparing a SID of the second element selected from the first list to a SID of the second element selected from the second list;

setting a bit to indicate that a path taken by the packet through was completed in response to determining that the SID of the second element selected from the first list compares equally to SID of the second element selected from the second list.

13. A system comprising:

a node configured to receive a packet, wherein the packet comprises an internet protocol (IP) header, which comprises a first extension header, wherein the first extension header comprises a first list of elements, wherein each of the elements in the first list comprises a respective segment identifier (SID);

update the packet, wherein the updating comprises adding a new element to the first list of elements;

wherein the new element comprises a segment identifier (SID) that identifies the node.

14. The system of claim 13 wherein the packet comprises a second extension header, wherein the second extension header comprises a second list of elements, wherein each element of the second list comprises a respective SID.

15. The system of claim 14 wherein the node is further configured to:

select a first element from the first list;

select a first element from the second list;

compare a SID of the first element selected from the first list to a SID of the first element selected from the second list.

16. The system of claim 15 wherein the node is further configured to:

in response to determining that the SID of the first element selected from the first list compares equally to the SID of the first element selected from the second list:

select a second element from the first list;

select a second element from the second list;

compare a SID of the second element selected from the first list to a SID of the second element selected from the second list;

set a bit in the packet in response to determining that the SID of the second element selected from the first list does not compare equally to SID of the second element selected from the second list.

17. The system of claim 16 wherein the bit, when set, indicates that the packet was rerouted through a network.

18. The system of claim 14 wherein the node is further configured to:

in response to determining that the SID of the first element selected from the first list compares equally to the SID of the first element selected from the second list:

select a second element from the first list;

select a second element from the second list;

compare a SID of the second element selected from the first list to a SID of the second element selected from the second list;

set a bit to indicate that a path taken by the packet through was completed in response to determining that the SID of the second element selected from the first list compares equally to SID of the second element selected from the second list.

* * * * *